United States Patent [19]
Boon

[11] Patent Number: 6,154,570
[45] Date of Patent: Nov. 28, 2000

[54] METHOD AND APPARATUS FOR DIGITAL IMAGE CODING AND DECODING, AND DATA RECORDING MEDIA

[75] Inventor: Choong Seng Boon, Moriguchi, Japan

[73] Assignee: Matsushita Electric Industrial Co., Ltd., Japan

[21] Appl. No.: 09/091,984

[22] PCT Filed: Nov. 12, 1997

[86] PCT No.: PCT/JP97/04107
  § 371 Date: Aug. 11, 1998
  § 102(e) Date: Aug. 11, 1998

[87] PCT Pub. No.: WO98/21896
  PCT Pub. Date: May 22, 1998

[30] Foreign Application Priority Data

Nov. 12, 1996 [JP] Japan ..................................... 8-00006

[51] Int. Cl.$^7$ ................................................. G06K 9/36
[52] U.S. Cl. .......................................... 382/236; 382/238
[58] Field of Search .................................. 382/236, 238, 382/240, 232; 348/403, 413

[56] References Cited

U.S. PATENT DOCUMENTS

| 5,608,458 | 3/1997 | Chen et al. | 348/413 |
| 5,818,531 | 10/1998 | Yamaguchi et al. | 348/403 |
| 5,878,169 | 3/1999 | Miyamoto | 382/236 |

FOREIGN PATENT DOCUMENTS

| 3-89792 | 4/1991 | Japan | H04N 7/133 |
| 3-268679 | 11/1991 | Japan | H04N 1/41 |

OTHER PUBLICATIONS

Orchad, "Predictive Motion–Field Segmentation for Image Sequence Coding", IEEE Transaction on Circuits and Systems for Video Technology, vol. 3, No. 1, pp. 54–70, Feb. 1993.

Kronander, "Post and Pre–Processing in Coding of Image Sequences Using Filters with Motion Compensated History", IEEE Acoustics, Speech, and Signal Processing, vol. 2, pp. 1104–1107, 1988.

Primary Examiner—Jose L. Couso
Assistant Examiner—Anh Hong Do
Attorney, Agent, or Firm—Parkhurst & Wendel, LLP

[57] ABSTRACT

A digital image coding apparatus includes a first encoder for performing difference coding to a low-resolution texture signal, and a second encoder for performing difference coding to a high-resolution texture signal. When difference coding is performed on a high-resolution texture signal using its prediction signal, padding processing in which insignificant sample values of a low-resolution texture signal that has been regenerated by the first encoder are replaced with pseudo sample values that are obtained from significant sample values thereof. A padding unit in the first encoder generates the prediction signal corresponding to the high-resolution texture signal on the basis of the regenerative low-resolution texture signal which has been subjected to the padding process.

1 Claim, 11 Drawing Sheets

METHOD AND APPARATUS FOR DIGITAL IMAGE CODING AND DECODING, AND DATA RECORDING MEDIA

TECHNICAL FIELD

The present invention relates to a method and an apparatus for coding digital image signals, a method and an apparatus for decoding coded digital image signals, and data recording media containing programs for making a computer execute coding processing and decoding processing of digital image signals and, more particularly, to time/space hierarchical coding processing of an image of an object having the arbitrary shape, and time/space hierarchical decoding processing corresponding thereto.

BACKGROUND ART

In order to store/transmit digital image information with good efficiency, it is required to perform compressive coding to the digital image information and, in the present circumstances, there are Discrete Cosine Transformation (DCT) which is representative in JPEG (Joint Photographic Coding Experts Group) and MPEG (Moving Picture Experts Group), and waveform coding methods such as subband, wavelet and fractal, as methods for compressively coding the digital image information.

As a method for removing redundant image information between adjacent pictures such as frames, there is a method of performing inter-picture prediction using motion compensation, that is, representing pixel values of pixels of the present picture using a difference between these pixel values and pixel values of pixels of the previous picture, and performing waveform coding to this difference signal.

Recently, in order both to improve compression efficiency and to regenerate an image signal for each of regions constituting one picture and corresponding to individual objects (hereinafter referred to as image spaces), a method of compressively coding an image signal object by object and transmitting the resulting signal has been made practicable. In this method, at the side of regeneration, coded image signals corresponding to individual objects are decoded, images of the individual objects regenerated by decoding are composed, thereby displaying an image corresponding to one picture. In this way, object-by-object coding of an image signal enables images of objects to be displayed to be freely combined and composed, whereby moving pictures can be easily reedited. Further, in this method, according to the congestion conditions of channels, the performance of a regenerative apparatus, and the viewer's taste, moving pictures can be displayed without regenerating images of relatively unimportant objects.

More specifically, as methods for coding an image signal for forming image space including an image of an object having the arbitrary shape (hereinafter referred to as an object image), there are conventionally a coding method using a transformation method adaptive for its shape (for example, shape adaptive discrete cosine transformation), and a coding method of padding pixel values of pixels constituting an invalid region of an image space (that is, an outside region of an object image) by a specified method, and then performing cosine transformation to an image signal comprising plural pixel values corresponding to the image space, for each of unit regions into which the image space is divided (blocks comprising 8×8 pixels).

As a specific method for removing a redundant signal between pictures such as frames, there is a method of using macroblocks comprising 16×16 pixels as unit regions, obtaining a difference between an image signal corresponding to a target macroblock as a target of coding processing and its prediction signal. Herein, the prediction signal is an image signal corresponding to a prediction region which is obtained by motion compensation. The motion compensation is processing of detecting a region comprising 16×16 pixels, the region providing an image signal having the smallest difference with the image signal of the target macroblock, in a picture which has been subjected to coding processing or decoding processing, as the prediction region.

However, when this prediction region is located at the boundary of the object image in the image space, the prediction region includes pixels with insignificant (undefined) sample values (pixel values). Therefore, concerning this prediction region, the corresponding image signal is subjected to padding processing in which the insignificant sample values are replaced with significant pseudo sample values, and a difference between the prediction signal which has been subjected to the padding processing and the image signal of the target macroblock is obtained as a prediction error signal (difference signal), and converting processing for coding is performed to the difference signal. Herein, the padding processing is executed to the prediction region for the purpose of suppressing the difference signal, i.e., reducing code quantity when the difference signal is coded.

In addition, there is a hierarchical processing method, which is called scalability, in which image signals corresponding to plural hierarchies having different resolutions are used as an image signal corresponding to each object, i.e., an image signal for forming image space including an object image, and the image signals of the respective hierarchies are coded to be decoded.

In such a hierarchical processing method, part of a bit stream that is extracted from transmitted data (coded bit stream) is decoded to regenerate an object image having low resolution, and all data is decoded to regenerate an object image having high resolution.

In the hierarchical coding (scalability coding) processing, an image signal corresponding to a high-resolution image (high-resolution image signal) is coded on the basis of an image signal corresponding to a low-resolution image (low-resolution image signal). That is, a high-resolution image signal corresponding to a target block as a target of coding processing is predicted using a corresponding low-resolution image signal to generate a predicted image signal, and a difference signal obtained by subtracting the predicted image signal from the high-resolution image signal of the target block, is coded.

When an image signal is coded object by object, a shape signal indicating the arbitrary shape of an object, together with a texture signal including a luminance signal and a color-difference signal for gradation color display of an object image, is coded as the image signal. Therefore, in performing scalability coding to the image signal corresponding to each object, it is necessary that not only the texture signal but the shape signal is separated into a high-resolution signal and a low-resolution signal to be hierarchically coded.

In this object-by-object scalability coding, it is required to predict a high-resolution texture signal from a low-resolution texture signal with good efficiency. Since, especially, a low-resolution texture signal corresponding to a macroblock located at the boundary of an object includes insignificant (undefined) sample values (pixel values), if this low-resolution texture signal is used as it is to generate a prediction signal and the prediction signal is subtracted from a high-resolution texture signal of a target macroblock as a target of coding processing, difference pixel values in a difference signal corresponding to the pixels located at the boundary of the object become large values, failing to code the high-resolution texture signal with good efficiency.

Further, since a shape signal is separated correspondingly to plural hierarchies having different resolutions, more specifically, a high-resolution hierarchy and a low-resolution hierarchy, there occurs disagreement of the boundaries indicating the inside and the outside of the object (outlines of the object), of the object shape obtained from the low-resolution shape signal and the object shape obtained from the high-resolution shape signal. This is because, by down-sampling processing in generating the low-resolution shape signal from the high-resolution shape signal, the shape of the object image of the low-resolution shape signal is transformed with respect to the shape of the object image of the high-resolution shape signal, and the object shapes of both the shape signals also are transformed by compression processing to the high-resolution shape signal and the low-resolution shape signal.

In this case, while a specified macroblock region in image space formed by a high-resolution texture signal is included in an object image, the specified macroblock region in image space formed by a low-resolution texture signal is wholly located outside the object image. In such a condition, even if a prediction signal of the high-resolution texture signal on the basis of the low-resolution texture signal is used, it is impossible to suppress a difference signal between the high-resolution texture signal and its prediction signal with good efficiency.

The present invention is subjected to solving the above-mentioned problems, and has an object to provide a digital image coding method and a digital image coding apparatus in which, on the basis of an image signal for forming image space including an image of an object having the arbitrary shape, image signals corresponding to plural hierarchies having different resolutions are generated and, in hierarchical coding processing of performing difference coding of a high-resolution image signal using a low-resolution image signal, to each of unit regions, the image signal of the unit region located at the boundary of the object can be compressed with good coding efficiency.

Another object of the present invention is to provide a digital image decoding method and a digital image decoding apparatus in which a coded image signal obtained by hierarchical coding processing that can compress an image signal for forming image space including an image of an object with good coding efficiency, can be accurately regenerated by corresponding hierarchical decoding processing.

Still another of the present invention is to provide data recording media containing programs for realizing the hierarchical coding processing in the digital image coding method and the hierarchical decoding processing by the digital image decoding method, using computers.

DISCLOSURE OF THE INVENTION

According to the present intention (claim 1), a digital image coding method for coding first and second input image signals having different resolutions, each signal forming image space including an image having the arbitrary shape and comprising plural pixels, includes performing coding processing to each of unit regions into which the image space is divided, in which coding processing the first input image signal is compressively coded to generate a first coded image signal, and the compressed first input image signal is expanded to generate a first regenerative image signal; performing padding processing in which insignificant pixel values are replaced with pseudo pixel values obtained by a specified method, to the first regenerative image signal corresponding to each unit region, and predicting the second input image signal corresponding to each unit region on the basis of the first regenerative image signal which has been subjected to the padding processing, to generate a prediction signal; and performing difference coding processing to each of unit regions, in which coding processing a difference signal that is a difference between the second input image signal corresponding to each unit region and its prediction signal is compressively coded to generate a coded difference signal, and the compressed difference signal is expanded and the prediction signal is added to the expanded difference signal, to generate a second regenerative image signal.

In the image coding method thus constructed, since the prediction signal of the second input image signal is generated on the basis of the first regenerative image signal which has been subjected to padding processing, the difference signal which is the difference between the second input image signal having the resolution different from that of the first input image signal and its prediction signal is suppressed, whereby the second input image signal corresponding to the unit region located on the boundary of the object can be compressed with suppressing degradation of coding efficiency.

Further, since, in coding processing of the second input image signal of the target unit region as a target of coding processing, a signal which is generated on the basis of the first regenerative image signal of the target unit region is used as its prediction signal, the coding processing of the second input image signal merely delays by time for processing the unit region, as compared with coding processing of the first input image signal. Therefore, at the side of decoding, on the basis of the first and second coded image signals which are obtained by coding the first and second input image signals, a high-resolution image and a low-resolution image can be regenerated almost without a time lag.

According to the present invention (claim 2), in a digital image coding method as defined in claim 1, the padding processing of the first regenerative image signal corresponding to each unit region comprises replacing the insignificant pixel values in the first regenerative image signal with pseudo pixel values obtained on the basis of significant pixel values in the first regenerative image signal.

In the image coding method thus constructed, since the padding processing of the first regenerative image signal corresponding to each unit region is performed on the basis of the significant pixel values in the first regenerative image signal, the difference between the prediction signal of the second input image signal which is obtained from the first input image signal and the second input image signal can be effectively suppressed.

According to the present invention (claim 3), a digital image coding apparatus comprises a first coding unit for coding a first input image signal for forming image space including an image having the arbitrary shape and comprising plural pixels; and a second coding unit for coding a second input image signal having different resolution from that of the first input image signal, for forming image space including the image and comprising plural pixels; wherein the first coding unit includes first coding means for performing coding processing to each of unit regions into which the image space is divided, in which coding processing the first input image signal is compressively coded to generate a first coded image signal, and the compressed first input image signal is expanded to generate a first regenerative image signal; and padding means for performing padding processing in which insignificant pixel values are replaced with pseudo pixel values obtained by a specified method, to the first regenerative image signal corresponding to each unit region; and the second coding unit includes prediction signal generating means for predicting the second input image signal corresponding to each unit region on the basis of the first regenerative image signal which has been subjected to the padding processing, to generate a prediction signal; and second coding means for performing difference coding processing to each of unit regions, in which coding processing a difference signal between the second input image signal corresponding to each unit region and its prediction signal is compressively coded to generate a coded difference signal, and the compressed difference signal is expanded and the prediction signal is added to the expanded difference signal, to generate a second regenerative image signal.

In the image coding apparatus thus constructed, since the prediction signal of the second input image signal is generated on the basis of the first regenerative image signal which has been subjected to padding processing, the difference signal which is the difference between the second input image signal having the resolution different from that of the first input image signal and its prediction signal is suppressed, whereby the second input image signal corresponding to the unit region located on the boundary of the object can be compressed with suppressing degradation of coding efficiency.

Further, since, in coding processing of the second input image signal of the target unit region as a target of coding processing, a signal which is generated on the basis of the first regenerative image signal of the target unit region is used as its prediction signal, the coding processing of the second input image signal merely delays by time for processing the unit region, as compared with coding processing of the first input image signal. Therefore, at the side of decoding, on the basis of the first and second coded image signals which are obtained by coding the first and second input image signals, a high-resolution image and a low-resolution image can be regenerated almost without a time lag.

According to the present invention (claim 4), a digital image coding apparatus as defined in claim 3 further includes resolution converting means for converting the first regenerative image signal which has been subjected to the padding processing so that its resolution agrees with that of the second input image signal, and outputting a resolution converting signal; wherein the prediction signal generating means comprises prediction means for predicting the second input image signal corresponding to each unit region on the basis of the second regenerative image signal to generate an auxiliary prediction signal; and switching means for performing switching between the auxiliary prediction signal and the resolution converting signal on the basis of control information included in the second input image signal; and the output of the switching means is output as the prediction signal of the second input image signal corresponding to each unit region.

In the image coding apparatus thus constructed, since one of the auxiliary prediction signal obtained from the second input image signal and the resolution converting signal obtained from the first input image signal is selected on the basis of the control information included in the second input image signal, and the selected signal is output as the prediction signal of the second input image signal corresponding to each unit region, the prediction signal can be adaptively switched by the simple construction, whereby coding efficiency in hierarchical coding processing can be more enhanced.

According to the present invention (claim 5), a digital image coding apparatus as defined in claim 3 further includes resolution converting means for converting the first regenerative image signal which has been subjected to the padding processing so that its resolution agrees with that of the second input image signal, and outputting a resolution converting signal; wherein the prediction signal generating means comprises prediction means for predicting the second input image signal corresponding to each unit region on the basis of the second regenerative image signal to generate an auxiliary prediction signal; and averaging means for weighting and averaging the auxiliary prediction signal and the resolution converting signal; and the output of the averaging means is output as the prediction signal of the second input image signal corresponding to each unit region.

In the image coding apparatus thus constructed, since the auxiliary prediction signal obtained from the second input image signal and the resolution converting signal obtained from the first input image signal are weighted and averaged, and the averaged signal is output as the prediction signal of the second input image signal corresponding to each unit region, the difference value between the prediction signal of the second input image signal obtained from the first regenerative image signal and the second input image signal can be finely controlled, whereby coding efficiency in hierarchical coding processing can be improved.

According to the present invention (claim 6), in a digital image coding apparatus as defined in claim 5, the padding means is for performing padding processing in which the insignificant pixel values in the first regenerative image signal are replaced with pseudo pixel values obtained on the basis of significant pixel values in the first regenerative image signal.

In the image coding apparatus thus constructed, since the padding processing of the first regenerative image signal corresponding to each unit region is performed on the basis of the significant pixel values in the first regenerative image signal, the difference between the prediction signal of the second input image signal obtained from the first input image signal and the second input image signal can be effectively suppressed.

According to the present invention (claim 7), in a digital image coding apparatus as defined in claim 3, the first coding means comprises an operator for obtaining a difference between the first input image signal corresponding to each unit region and its prediction signal and outputting a difference signal; a compressor for compressing the difference signal; an encoder for coding the compressed difference signal; an expander for expanding the compressed difference signal; an adder for adding the output of the expander to the prediction signal of the first input image signal, and outputting a first regenerative image signal to the padding means; a frame memory for storing the output of the padding means; and a prediction signal generator for generating the prediction signal of the first input image signal corresponding to each unit region, on the basis of the first regenerative image signal which has been subjected to the padding processing, which image signal is stored in the frame memory.

In the image coding apparatus thus constructed, since the first regenerative image signal which has been subjected to padding processing is stored in the frame memory, motion detection and motion compensation can be executed with good precision.

According to the present invention (claim 8), a digital image decoding method for decoding first and second coded image signals which are obtained by performing coding processing to first and second image signals having different resolutions, each signal forming image space including an image having the arbitrary shape and comprising plural pixels, to generate first and second regenerative image signals, includes performing decoding processing in which a first regenerative image signal is generated from the first coded image signal, to each of unit regions into which the image space is divided; performing padding processing in which insignificant pixel values are replaced with pseudo pixel values obtained by a specified method, to the first regenerative image signal corresponding to each unit region, and predicting a second regenerative image signal corresponding to each unit region on the basis of the first regenerative image signal which has been subjected to the padding processing, to generate a regenerative prediction signal; and performing difference decoding processing to each of unit regions, in which decoding processing the second coded image signal corresponding to each unit region is decoded to regenerate a difference signal between the second image signal and its prediction signal, and the regenerative prediction signal is added to the difference signal to generate a second regenerative image signal.

In the image decoding method thus constructed, since the regenerative prediction signal of the second regenerative image signal is generated on the basis of the first regenerative image signal which has been subjected to padding processing, the second coded image signal obtained by hierarchically coding the second image signal on the basis of the first image signal, can be hierarchically decoded accurately using the first regenerative image signal.

Further, since, in decoding processing of the second coded image signal corresponding to the target unit region as a target of decoding processing, a signal which is generated on the basis of the first regenerative image signal corresponding to the target unit region is used as its prediction signal, the decoding processing of the second coded image signal merely delays by time for processing the unit region, as compared with decoding processing of the first coded image signal. Therefore, on the basis of the first and second coded image signals which are obtained by hierarchical coding processing of the image signal, a high-resolution image and a low-resolution image can be regenerated almost without a time lag.

According to the present invention (claim 9), in a digital image decoding method as defined in claim 8, the padding processing of the first regenerative image signal corresponding to each unit region comprises replacing the insignificant pixel values in the first regenerative image signal with pseudo pixel values obtained on the basis of significant pixel values in the first regenerative image signal.

In the image decoding method thus constructed, since the padding processing of the first regenerative image signal corresponding to each unit region is performed on the basis of the significant pixel values in the first regenerative image signal, the coded difference signal which is obtained by coding with effectively suppressing the difference between the prediction signal of the second image signal obtained from the first image signal and the second image signal, can be accurately decoded.

According to the present invention (claim 10), a digital image decoding apparatus comprises a first decoding unit for decoding a first coded image signal which is obtained by performing coding processing to a first image signal for forming image space including an image having the arbitrary shape and comprising plural pixels, to generate a first regenerative image signal; and a second decoding unit for decoding a second coded image signal which is obtained by performing coding processing to a second image signal having different resolution from that of the first image signal, for forming image space including the image and comprising plural pixels; wherein the first decoding unit includes first decoding means for performing decoding processing in which a first regenerative image signal is generated from the first coded image signal, to each of unit regions into which the image space is divided; and padding means for performing padding processing in which insignificant pixel values are replaced with pseudo pixel values obtained by a specified method, to the first regenerative image signal corresponding to each unit region; and the second decoding unit includes prediction signal generating means for predicting a second regenerative image signal corresponding to each unit region on the basis of the first regenerative image signal which has been subjected to the padding processing, to generate a regenerative prediction signal; and second decoding means for performing difference decoding processing to each of unit regions, in which decoding processing the second coded image signal corresponding to each unit region is decoded to regenerate a difference signal between the second image signal and its prediction signal, and the regenerative prediction signal is added to the difference signal to generate a second regenerative image signal.

In the image decoding apparatus thus constructed, since the regenerative prediction signal of the second regenerative image signal is generated on the basis of the first regenerative image signal which has been subjected to padding processing, the second coded image signal obtained by hierarchically coding the second image signal on the basis of the first image signal, can be hierarchically decoded accurately using the first regenerative image signal.

Further, since, in decoding processing of the second coded image signal corresponding to the target unit region as a target of decoding processing, a signal which is generated on the basis of the first regenerative image signal corresponding to the target unit region is used as its prediction signal, the decoding processing of the second coded image signal merely delays by time for processing the unit region, as compared with decoding processing of the first coded image signal. Therefore, on the basis of the first and second coded image signals which are obtained by hierarchical coding processing of the image signal, a high-resolution image and a low-resolution image can be regenerated almost without a time lag.

According to the present invention (claim 11), a digital image decoding apparatus as defined in claim 10 further includes resolution converting means for converting the first regenerative image signal which has been subjected to the padding processing so that its resolution agrees with that of the second regenerative image signal, and outputting a resolution converting signal; wherein the prediction signal generating means comprises prediction means for predicting the second regenerative image signal corresponding to each unit region on the basis of the second regenerative image signal to generate an auxiliary prediction signal; and switching means for performing switching between the auxiliary prediction signal and the resolution converting signal on the basis of control information included in the second coded image signal; and the output of the switching means is output as the prediction signal of the second regenerative image signal corresponding to each unit region.

In the image decoding apparatus thus constructed, since one of the auxiliary prediction signal obtained from the second regenerative image signal and the resolution converting signal obtained from the first regenerative image signal is selected on the basis of the control information included in the second coded image signal, and the selected signal is output as the regenerative prediction signal of the second regenerative image signal corresponding to each unit region, the regenerative prediction signal can be adaptively switched by the simple construction, whereby hierarchical decoding processing corresponding to hierarchical coding processing with more enhanced coding efficiency can be easily realized.

According to the present invention (claim 12), a digital image decoding apparatus as defined in claim 10 further includes resolution converting means for converting the first regenerative image signal which has been subjected to the padding processing so that its resolution agrees with that of the second regenerative image signal, and outputting a resolution converting signal; wherein the prediction signal generating means comprises prediction means for predicting the second regenerative image signal corresponding to each unit region on the basis of the second regenerative image signal to generate an auxiliary prediction signal; and averaging means for weighting and averaging the auxiliary prediction signal and the resolution converting signal; and the output of the averaging means is output as the regenerative prediction signal of the second regenerative image signal corresponding to each unit region.

In the image decoding apparatus thus constructed, since the auxiliary prediction signal obtained from the second regenerative image signal and the resolution converting signal obtained from the first regenerative image signal are weighted and averaged, and the averaged signal is output as the regenerative prediction signal of the second regenerative image signal corresponding to each unit region, hierarchical decoding processing corresponding to hierarchical coding processing in which the difference between the prediction signal of the second image signal obtained from the first image signal and the second image signal is finely controlled, can be realized.

According to the present invention (claim 13), in a digital image decoding apparatus as defined in claim 12, the padding means is for performing padding processing in which the insignificant pixel values in the first regenerative image signal are replaced with pseudo pixel values obtained on the basis of significant pixel values in the first regenerative image signal.

In the image decoding apparatus thus constructed, since the padding processing of the first regenerative image signal corresponding to each unit region is performed on the basis of the significant pixel values in the first regenerative image signal, the coded difference signal which is obtained by coding with effectively suppressing the difference between the prediction signal of the second image signal obtained from the first image signal and the second image signal, can be accurately decoded.

According to the present invention (claim 14), in a digital image decoding apparatus as defined in claim 10, the first coded image signal is a coded difference signal obtained by compressively coding a difference signal that is a difference between the first image signal corresponding to each unit region and its prediction signal; and the first decoding means comprises a decoder for decoding the coded difference signal; an expander for expanding the output of the decoder to generate a regenerative difference signal; an adder for adding the regenerative difference signal as the output of the expander to the regenerative prediction signal of the first regenerative image signal, and outputting a first regenerative image signal to the padding means; a frame memory for storing the output of the padding means; and a prediction signal generator for generating the regenerative prediction signal of the first regenerative image signal corresponding to each unit region, on the basis of the first regenerative image signal which has been subjected to the padding processing, which image signal is stored in the frame memory.

In the image decoding apparatus thus constructed, since the first regenerative image signal which has been subjected to padding processing is stored in the frame memory, motion compensation in decoding processing can be executed with good precision.

According to the present invention (claim 15), a data recording medium contains a program for making a computer execute coding processing of first and second input image signals having different resolutions, each signal forming image space including an image having the arbitrary shape and comprising plural pixels, the program making a computer execute processes for performing coding processing to each of unit regions into which the image space is divided, in which coding processing the first input image signal is compressively coded to generate a first coded image signal, and the compressed first input image signal is expanded to generate a first regenerative image signal; performing padding processing in which insignificant pixel values are replaced with pseudo pixel values obtained by a specified method, to the first regenerative image signal corresponding to each unit region, and predicting the second input image signal corresponding to each unit region on the basis of the first regenerative image signal which has been subjected to the padding processing, to generate a prediction signal; and performing difference compressive coding to each of unit regions, in which coding processing a difference signal that is a difference between the second input image signal corresponding to each unit region and its prediction signal is compressively coded to generate a coded difference signal, and the compressed difference signal is expanded and the prediction signal is added to the expanded difference signal, to generate a second regenerative image signal.

In the data recording medium thus constructed, since the prediction signal of the second input image signal is generated on the basis of the first regenerative image signal which has been subjected to padding processing, the difference signal which is the difference between the second input image signal having the resolution different from that of the first input image signal and its prediction signal is suppressed, whereby a computer can realize processing of compressing the second input image signal corresponding to the unit region located on the boundary of the object, with suppressing degradation of coding efficiency.

According to the present invention (claim 16), a data recording medium contains a program for making a computer execute processing for decoding first and second coded image signals which are obtained by performing coding processing to first and second image signals having different resolutions, each signal regenerating image space including an image having the arbitrary shape and comprising plural pixels, to generate first and second regenerative image signals, the program making a computer execute processes for performing decoding processing in which a first regenerative image signal is generated from the first coded image signal, to each of unit regions into which the image space is divided; performing padding processing in which insignificant pixel values are replaced with pseudo pixel values obtained by a specified method, to the first regenerative image signal corresponding to each unit region, and predicting a second regenerative image signal corresponding to each unit region on the basis of the first regenerative image signal which has been subjected to the padding processing, to generate a regenerative prediction signal; and performing difference decoding processing to each of unit regions, in which decoding processing the second coded image signal corresponding to each unit region is decoded to regenerate a difference signal between the second image signal and its prediction signal, and the regenerative prediction signal is added to the difference signal to generate a second regenerative image signal.

In the data recording medium thus constructed, the regenerative prediction signal of the second regenerative image signal is generated on the basis of the first regenerative image signal which has been subjected to padding processing, whereby a computer can realize processing of accurately decoding the coded difference signal which is obtained by coding with suppressing the difference between the second input image signal having the resolution different from that of the first input image signal and its prediction signal.

BRIEF DESCRIPTION OF THE DRAWINGS

FIGS. 5(a)–5(b) are schmatic diagrams for explaining processing of predicting a high-resolution texture signal on the basis of a low-resolution texture signal, by the digital image coding apparatus, wherein FIGS. 5(a) and 5(b) show high-resolution image space and low-resolution image space, respectively.

BEST EMBODIMENTS FOR EXECUTING THE INVENTION

A description will be given of embodiments of the present invention using FIGS. 1 to 12.

Embodiment 1.

Figure 1:
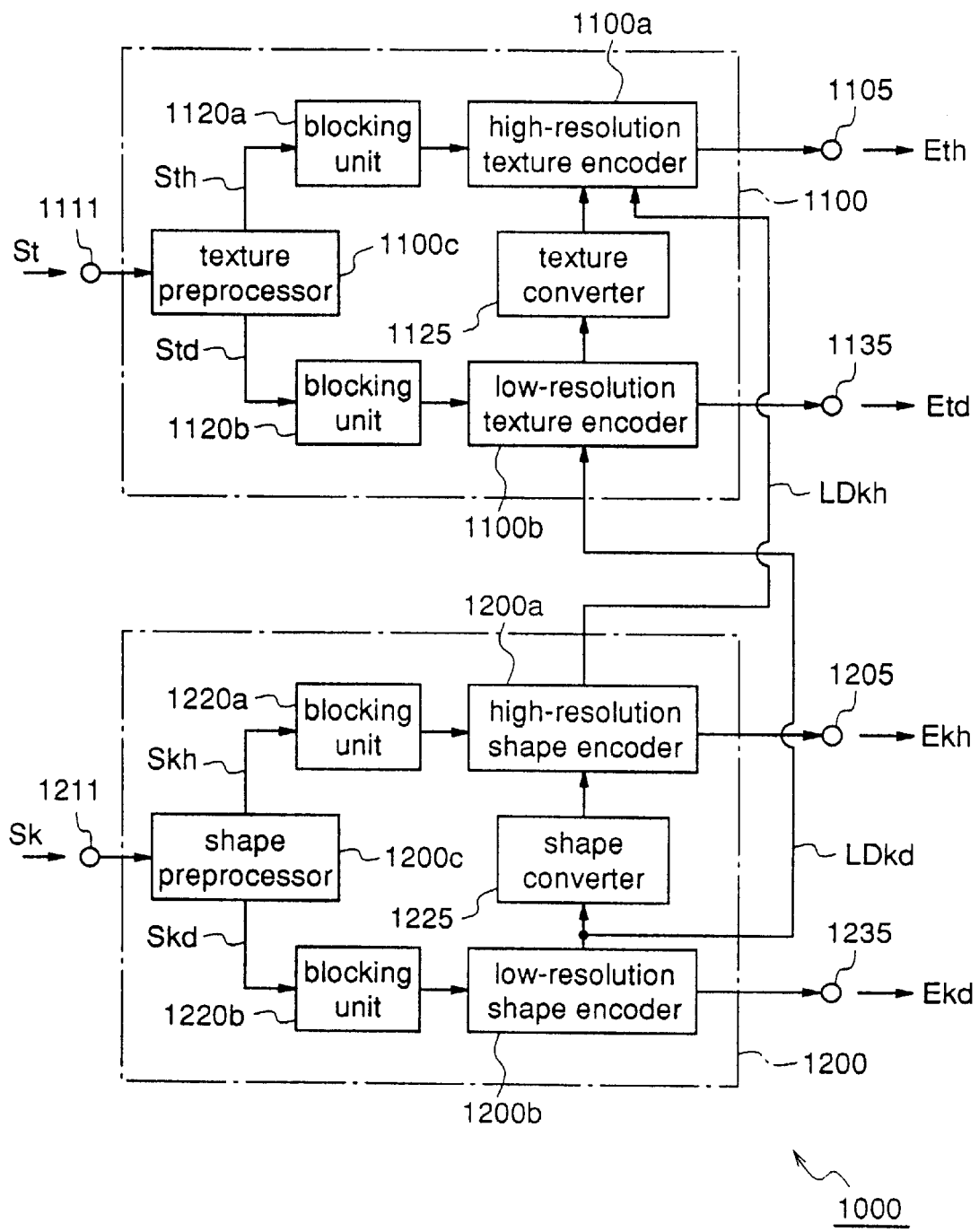
FIG. 1 is a block diagram for explaining a general construction of a digital image coding apparatus in accordance with a first embodiment of the present invention.

FIG. 1 is a block diagram for explaining a digital image coding apparatus 1000 according to a first embodiment of the present invention.

This digital image coding apparatus 1000 is for performing scalability coding of an image signal object by object, and has a texture coding unit 1100 for performing scalability coding processing to a texture signal constituting the image signal, for color-displaying an object, and a shape coding unit 1200 for performing scalability coding processing to a shape signal constituting the image signal and indicating the shape of the object.

The texture coding unit 1100 includes a texture preprocessor 1100c for receiving the texture signal and generating a texture signal corresponding to a hierarchy having high resolution (hereinafter referred to as a high-resolution texture signal) and a texture signal corresponding to a hierarchy having low resolution (hereinafter referred to as a low-resolution texture signal), a blocking unit 1120a for dividing the high-resolution texture signal correspondingly to blocks as units of coding processing, and a blocking unit 1120b for dividing the low-resolution texture signal correspondingly to blocks as units of coding processing.

As shown in FIG. 3(a), the preprocessor 1100c has a lowpass filter (LPF) 201 for performing filtering processing to the texture signal St which has been received by an input terminal 203, and a reducing unit 202 for reducing the output of the filter 201 by down-sampling, and has a construction in which the texture signal St is output as it is, as a high-resolution texture signal Sth, to a first output terminal 216, and the texture signal which is obtained by reducing the texture signal St in the reducing unit 202, is output, as a low-resolution texture signal Std, to a second output terminal 204.

The texture coding unit 1100 further includes an encoder 1100b for performing difference coding processing to the low-resolution texture signal for each of unit processing regions (blocks) into which a display region of a prescribed object (that is, image space including an image of an object having the arbitrary shape) is divided, and outputting a coded low-resolution texture difference signal (hereinafter referred to as a coded LT difference signal) Etd, a texture converter 1125 for performing conversion of the resolution of a regenerative signal so that the regenerative signal used for the difference coding processing of the low-resolution texture signal Std can be utilized for difference coding processing of the high-resolution texture signal Sth, and an encoder 1100a for performing difference coding processing to the high-resolution texture signal Sth for each of the unit processing regions (blocks), on the basis of the output of the texture converter 1125, and outputting a coded high-resolution texture difference signal (hereinafter referred to as a coded HT difference signal) Eth.

The shape coding unit 1200 includes a shape preprocessor 1200c for receiving the shape signal Sk and generating a shape signal corresponding to a hierarchy having high resolution (hereinafter referred to as a high-resolution shape signal) Skh and a shape signal corresponding to a hierarchy having low resolution (hereinafter referred to as a low-resolution shape signal) Skd. This shape preprocessor 1200c has just the same construction as that of the texture preprocessor 1100c. The shape coding unit 1200 further includes an encoder 1200b for performing difference coding processing to the low-resolution shape signal Skd for each of unit processing regions (blocks) into which a display region of a prescribed object (image space including an image of an object having the arbitrary shape) is divided, and outputting a coded low-resolution shape difference signal (hereinafter referred to as a coded LS difference signal) Ekd, a shape converter 1225 for performing conversion of the resolution of a regenerative signal so that the regenerative signal used for the difference coding processing of the low-resolution shape signal Skd can be utilized for difference coding processing of the high-resolution shape signal Skh, and an encoder 1200a for performing difference coding processing to the high-resolution shape signal Skh for each of the unit processing regions (blocks), on the basis of the output of the shape converter 1225, and outputting a coded high-resolution shape difference signal (hereinafter referred to as a coded HS difference signal) Ekh.

In addition, each encoder has a mode decision unit for deciding a mode of coding processing which is to be executed to each of the unit processing regions (blocks) on the basis of the input texture signal or shape signal, although it is not shown in the figure.

Figure 2:
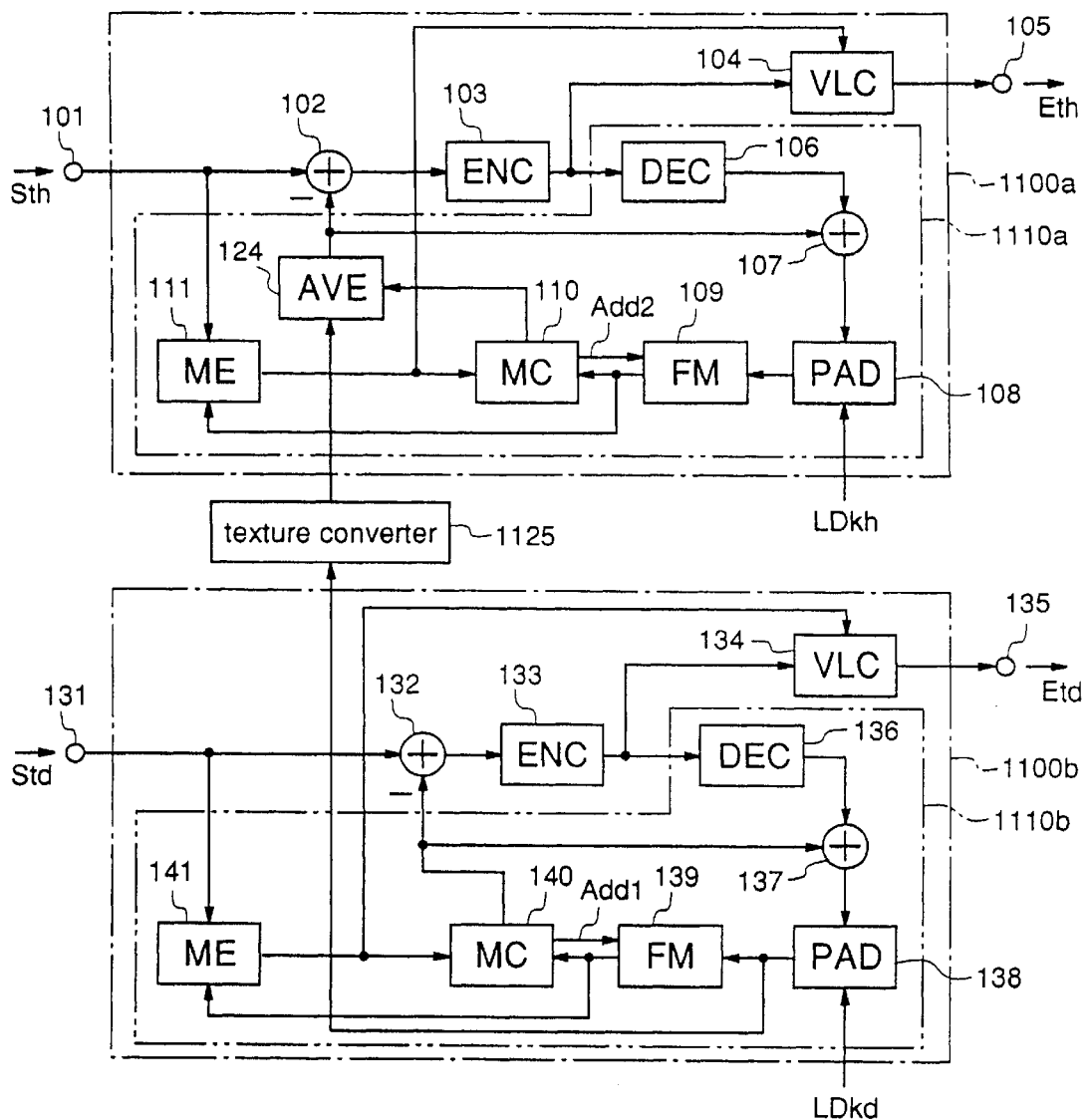
FIG. 2 is a block diagram illustrating a detailed construction of texture coding units constituting the digital image coding apparatus according to the first embodiment of the invention.
Figure 3:
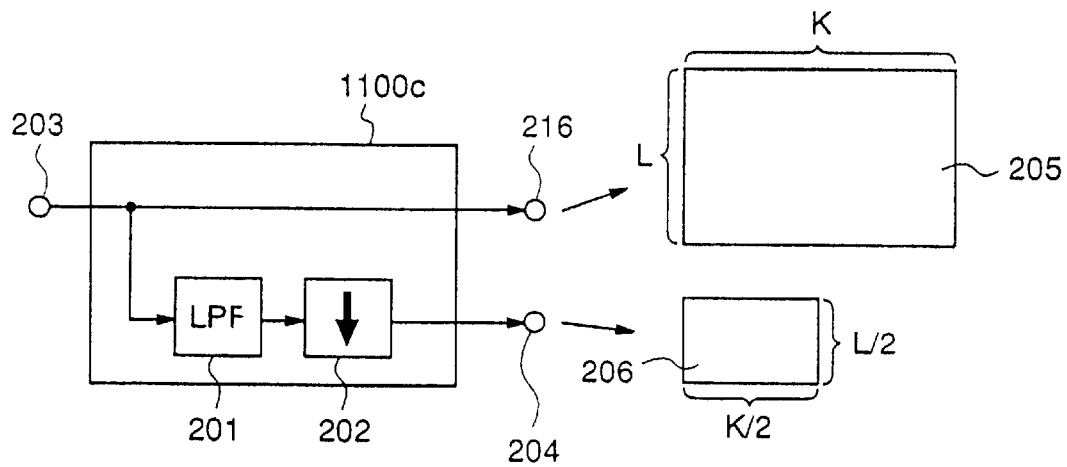
FIGS. 3(a)–3(b) are block diagrams illustrating specific constructions of a preprocessor constituting the digital image coding apparatus according to the first embodiment of the invention.
Figure 3:
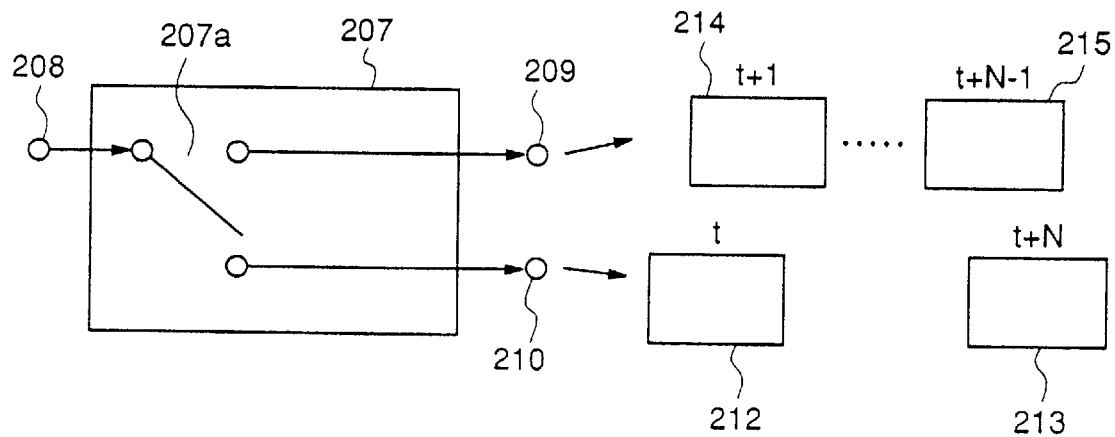
Figure 4:
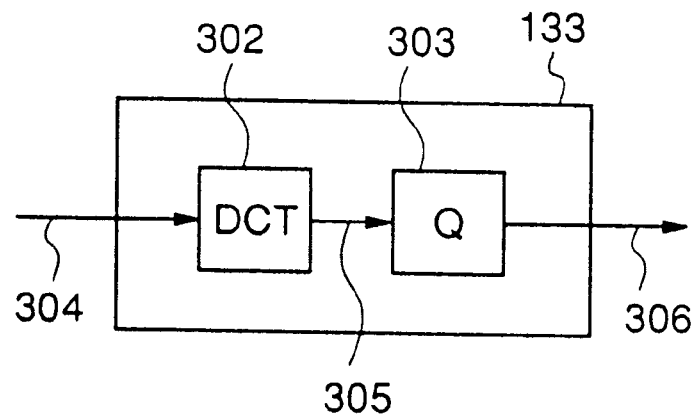
FIG. 4(a) is a block diagram illustrating a specific construction of an encoder in the texture coding unit according to the first embodiment of the invention.
FIG. 4(b) is a block diagram illustrating a specific construction f a local decoder in the texture coding unit.
Figure 4:
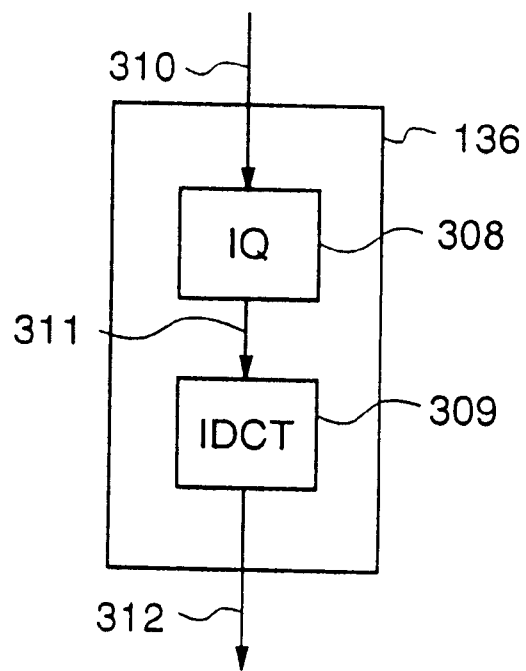

A description is given of detailed constructions of the respective encoders 1100a and 1100b in the texture coding unit 1100, using FIG. 2.

The low-resolution texture encoder 1100b consists of a first adder 132 for generating a difference signal between a low-resolution texture signal of a target block as a target of coding processing and its prediction signal, a first information compressor (ENC) 133 for compressing the difference signal as the output of the adder 132, a first variable-length encoder (VLC) 134 for performing variable-length coding to the output of the information compressor 133, and a prediction signal generating unit 1100b for generating the prediction signal.

As shown in FIG. 4(a), the first information compressor 133 consists of a DCT unit 302 for performing DCT (Discrete Cosine Transformation) processing, which is a kind of frequency transformation processing, to a difference signal 304 between a low-resolution texture signal of a target block and its prediction signal, and a quantizer 303 for quantizing a frequency component 305 of the difference signal obtained by the frequency transformation, and outputting a quantized signal 306.

The prediction signal generating unit 1110b includes a first information expander (DEC) 136 for expanding the output (compressed difference signal) of the first information compressor 133 to regenerate the difference signal, and a second adder 137 for adding the prediction signal to the regenerative difference signal from the information expander 136 to regenerate the low-resolution texture signal.

As shown in FIG. 4(b), the first information expander 136 consists of an inverse quantizer 308 for inverse-quantizing a compressed difference signal 310, and an IDCT unit 309 for performing IDCT processing for converting data of a frequency region into data of a space region to an inverse-quantized compressed difference signal 311, and outputting an expanded difference signal 312.

The prediction signal generating unit 1110b further includes a first padding unit 138 for receiving the output of the adder 137 and padding insignificant sample values (pixel values) in the regenerative low-resolution texture signal on the basis of a low-resolution shape signal which has been regenerated by the low-resolution shape coding unit 1200b, and a first frame memory 139 for storing the padded regenerative low-resolution texture signal as the output of the padding unit 138, and the output of the padding unit 138 is also output to the texture converter 1125.

The prediction signal generating unit 1110b furthermore includes a first motion detector (ME) 141 for obtaining, on the basis of the output of the first frame memory 139 and the input low-resolution texture signal Std, motion displacement information (motion vector) indicating a prediction region having the same size as that of the target block, the prediction region providing a prediction signal having the smallest difference with the low-resolution texture signal of the target block, and outputting the same, and a first motion compensator (MC) 140 for generating an address Add1 in the frame memory 139 on the basis of the motion vector from the motion detector 141, reading a regenerative low-resolution texture signal corresponding to the prediction region, as the prediction signal, from the frame memory 139, and outputting the same to the first and second adders 132 and 137.

Meanwhile, the high-resolution texture encoder 1100a has almost the same construction as that of the low-resolution texture encoder 1100b.

That is, the high-resolution texture encoder 1100a consists of a third adder 102 for generating a difference signal between a high-resolution texture signal of a target block as a target of coding processing and its prediction signal, a second information compressor (ENC) 103 for compressing the difference signal as the output of the adder 102, a second variable-length encoder (VLC) 104 for performing variable-length coding to the output of the information compressor 103, and a prediction signal generating unit 1110a for generating the prediction signal.

The second information compressor 103, like the first information compressor 133, consists of a DCT unit 302 for performing DCT (Discrete Cosine Transformation) processing, which is a kind of frequency transformation processing, to a difference signal between a high-resolution texture signal of a target block and its prediction signal, and a quantizer 303 for quantizing a frequency component of the difference signal obtained by the frequency transformation (refer to FIG. 4(a)).

The prediction signal generating unit 1110a includes a second information expander (DEC) 106 for expanding the output (compressed difference signal) of the second information compressor 103 to regenerate the difference signal, and a fourth adder 107 for adding the prediction signal to the regenerative difference signal from the information expander 106 to regenerate the high-resolution texture signal.

The prediction signal generating unit 1110a further includes a second padding unit 108 for receiving the output of the adder 107 and padding insignificant sample values (pixel values) in the regenerative high-resolution texture signal on the basis of a high-resolution shape signal which has been regenerated by the high-resolution shape coding unit 1200a, and a second frame memory 109 for storing the padded regenerative high-resolution texture signal as the output of the padding unit 108.

The prediction signal generating unit 1110a furthermore includes a second motion detector (ME) 111 for obtaining, on the basis of the output of the second frame memory 109 and the input high-resolution texture signal, motion displacement information (motion vector) indicating a prediction region having the same size as that of the target block, the prediction region providing a prediction signal having the smallest difference with the high-resolution texture signal of the target block, and outputting the same, a second motion compensator (MC) 110 for generating an address Add2 in the frame memory 109 on the basis of the motion vector from the motion detector 111, and reading a regenerative high-resolution texture signal corresponding to the prediction region, as the prediction signal, from the frame memory 109, and an averaging unit (AVE) 124 for averaging the output of the second motion compensator (MC) 110 and the output of the texture converter 112S, and outputting the resulting average to the third adder 102.

This averaging unit 124 has a construction in which the output of the second motion compensator (MC) 110 and the output of the texture converter 112S are weighted at a constant ratio and averaged, on the basis of an output of a mode decision unit (not shown).

Alternatively, in place of the averaging unit 124 which performs weighting and averaging processing, one of the output of the second motion compensator (MC) 110 and the output of the texture converter 112S may be selected on the basis of the output of the mode decision unit to output the selected output, as the prediction signal of the high-resolution texture signal, to the third adder 102.

A description is given of specific constructions of the low-resolution shape encoder 1200b and the high-resolution shape encoder 1200a. Since these encoders fundamentally have the same constructions as those of the low-resolution texture encoder 1100b and the high-resolution texture encoder 1100a, no detailed description using a figure is given thereof, and only the difference in construction between each texture encoder and each shape encoder is described briefly.

That is, the low-resolution shape encoder 1200b is different from the low-resolution texture encoder 1100b only in that the shape encoder does not have the padding unit 138 in the low-resolution texture encoder 1100b and has a construction in which the output of the adder 137 is input directly to the first frame memory 139. The high-resolution shape encoder 1200a is different from the high-resolution texture encoder 1100a only in that the shape encoder does not have the padding unit 108 in the high-resolution texture encoder 1110a and has a construction in which the output of the adder 107 is input directly to the second frame memory 109.

A description is given of the operation.

When a texture signal St and a shape signal Sk corresponding to a prescribed object are respectively input as an image signal, to a texture input terminal 1111 and to a shape input terminal 1211, the texture coding unit 1100 performs scalability coding processing to the texture signal St, and the shape coding unit 1200 performs scalability coding processing to the shape signal Sk.

That is, in the texture coding unit 1100, a high-resolution texture signal Sth and a low-resolution texture signal Std are generated from the texture signal St by the preprocessor 1100c. More specifically, as shown in FIG. 3(a), in the preprocessor 1100c, the input texture signal (image series) St is output as it is, as the high-resolution texture signal Sth, to the first output terminal 216, while a high-band component is eliminated from the texture signal St by the lowpass filter 201 and the output of the filter is down-sampled by the reducing unit 202, to output the resulting signal, as the low-resolution texture signal Std, to the second output terminal 204.

In this case, while image space (image display screen) 205 including the image of the object and comprising (K×L) pieces of samples (pixels) is obtained from the high-resolution texture signal Sth, image space (image display screen) 206 including the image of the object and comprising (K/2×L/2) pieces of samples (pixels) is obtained from the low-resolution texture signal Std. Herein, K and L are integers. In other words, in the reducing unit 202, processing of reducing the filter output by every other sample is performed as the down-sampling processing. However, this construction of the reducing unit is one example, and down-sampling processing at a ratio other than 1/2 may be executed to the texture signal St.

At this time, in the shape coding unit 1200, in the same manner as the preprocessing of the texture signal in the texture coding unit 1100, preprocessing of the shape signal of the object is performed by the preprocessor 1200c.

Next, the high-resolution texture signal Sth and the low-resolution texture signal Std are respectively divided by the blocking units 1120a and 1120b, correspondingly to block regions of prescribed sizes into which one image display screen (image space) is partitioned, to be respectively input to the high-resolution texture encoder 1100a and to the low-resolution texture encoder 1100b.

In this case, although the respective texture signals Sth and Std are divided correspondingly to block regions of rectangular shapes comprising (8×8) pieces or (16×16) pieces of samples, the respective texture signals may be divided correspondingly to block regions of arbitrary shapes.

At this time, in the shape coding unit 1200, blocking processing similar to the blocking processing to the texture signals is performed to the high-resolution shape signal Skh and the low-resolution shape signal Skd, by the blocking units 1220a and 1220b.

Then, when the low-resolution and high-resolution texture signals corresponding to a block as a target of coding processing (hereinafter referred to as a target block) have been respectively input to the low-resolution encoder 1100b and the high-resolution encoder 1100a, the respective encoders perform difference coding processing to these signals.

Although coding processing is performed block by block to the low-resolution and high-resolution shape signals, by the corresponding encoders 1200a and 1200b, the coding processing to the shape signals is different from the coding processing to the texture signals only in that no padding processing is performed. So, a detailed description is given of only the texture signals.

Initially, a description is given of difference coding processing to the low-resolution texture signal Std in the low-resolution encoder 1110b.

At the same time that the low-resolution texture signal Std of the target block is input to the first motion detector 141, expanded texture signals obtained by expanding texture signals which have been compressed are read, as texture signals of a reference picture, from the first frame memory 139 to the first motion detector 141.

This first motion detector 141 detects a prediction block in the reference picture, the prediction block providing a prediction signal having the smallest difference with the low-resolution texture signal of the target block, by a block matching method or the like, to output motion displacement information (hereinafter referred to as a motion vector) indicating the position of the prediction region based on the target block.

This motion vector is sent to the first motion compensator 140, and a low-resolution texture signal corresponding to the prediction block is generated as a prediction signal, from the reference low-resolution texture signals corresponding to the reference picture. At this time, the motion vector corresponding to the target block is supplied to the variable-length encoder 134 to be converted into a corresponding variable length code.

The low-resolution texture signal of the target block and the low-resolution texture signal of the prediction block are supplied to the first adder 132, and a difference signal between both the signals is generated by the first adder 132, and this difference signal is compressed by the first information compressor 133.

Although the compression processing of the difference signal in this first information compressor 133 is performed by frequency transformation of the DCT unit 302 and quantization of the quantizer 303 as shown in FIG. 4(a), methods such as subband transformation and vector quantization may be employed for the compression processing of the difference signal. In this case, the quantized difference signal (compressed difference signal) is supplied to the variable-length encoder 134, and variable-length coding is performed thereto.

Then, the compressed difference signal which has been subjected to the variable-length coding Etd is output to the output terminal 135 together with other side information including the motion vector which has been subjected to the variable-length coding.

At this time, in the low-resolution prediction signal generating unit 1110b, a prediction signal is generated on the basis of the compressed difference signal as the output of the information compressor 133.

More specifically, when the compressed difference signal has been input to the prediction signal generating unit 1110b, the information expander 136 performs expansion processing to this compressed difference signal to output an expanded difference signal. In this embodiment, as shown in FIG. 4(b), the compressed difference signal is inverse-quantized by the inverse quantizer 308, and the inverse-quantized compressed difference signal is converted from data of a frequency region into data of a space region, by the IDCT unit 309.

By the second adder 137, the expanded difference signal from the information expander 136 is added to the low-resolution texture signal of the corresponding prediction block, and the signal which is obtained by the addition is output as a regenerative low-resolution texture signal corresponding to the target block. This regenerative low-resolution texture signal is input to the first padding unit (PAD) 138, and the padding unit 138 performs padding processing to the regenerative low-resolution texture signal. Then, the regenerative low-resolution texture signal which has been subjected to the padding processing is stored in the first frame memory 139, as a reference low-resolution texture signal. Herein, the padding processing is processing of replacing insignificant sample values among plural sample values (pixel values) constituting a regenerative low-resolution texture signal corresponding to each block with significant sample values, and decision as to whether the sample values are significant or not is performed with reference to a regenerative low-resolution shape signal which is obtained by performing expansion processing and the like to a compressed difference signal, in the low-resolution shape coding unit 1200b.

Figure 6:
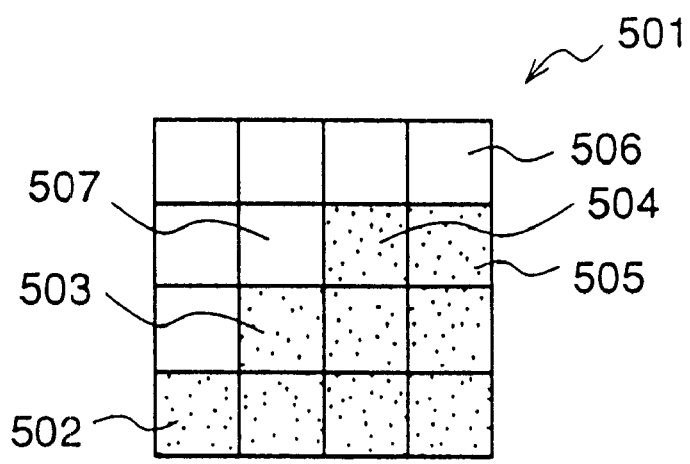
FIG. 6 is a schematic diagram for explaining image padding processing by the digital image coding apparatus according to the first embodiment of the invention.

FIG. 6 is a schematic diagram for explaining the padding processing by the first padding unit 138. In FIG. 6, in order to simplify the explanation, each of blocks 501 into which image space formed by a regenerative low-resolution texture signal is partitioned comprises (4×4) pieces of samples, and each rectangular region in the block 501 shows one sample (pixel). In addition, among plural rectangular regions, rectangular regions marked with dots indicate significant samples which are located inside an object, and the other rectangular regions (regions not marked with dots) indicate insignificant samples which are located outside the object.

In padding processing to sample values of insignificant samples, sample values of samples which are located at the boundary (periphery) of an object are used. In FIG. 6, samples 502, 503, 504 and 505 are the samples located at the boundary, and the sample values of the insignificant samples are replaced with the sample values of these significant samples, thereby padding the sample values of the samples which are located at regions outside the object. For example, a sample value of a sample 506 is replaced with the sample value of the sample 505. Concerning such a sample outside the object as a sample 507 adjacent to both of the significant sample 503 and the significant sample 504, its sample value is padded with an average of the sample values of both the significant samples.

Although the above description is given of the padding processing of replacing a sample value of an insignificant sample with a sample value of a significant sample adjacent to the insignificant sample, the padding processing may be processing of replacing the sample value of the insignificant sample with an average of sample values of all significant samples located at the boundary of the object. Further, when there are plural significant samples adjacent to the insignificant sample, the sample value of the insignificant sample may be replaced with the largest or smallest sample value among the sample values of the plural significant samples.

At this time, as mentioned above, in the first motion detector 141, the motion vector is generated on the basis of the input low-resolution texture signal and the regenerative low-resolution texture signal for reference which is stored in the frame memory, by a block matching method or the like and, in the first motion compensator 140, the low-resolution texture signal corresponding to the prediction block is generated on the basis of this motion vector to be output as a prediction signal, to the first adder 132.

Next, a description is given of difference coding processing to the high-resolution texture signal Sth in the high-resolution encoder 1100a.

This difference coding processing to the high-resolution texture signal Sth is fundamentally identical to the difference coding processing to the low-resolution texture signal Std, except that processing for generating a prediction signal corresponding to the target block is a little different from that of the low-resolution texture signal.

That is, the prediction signal generating unit 1110a in the high-resolution texture encoder 1100a uses the regenerative low-resolution texture signal (space prediction signal) which has been subjected to the padding processing by the first padding unit 138 in the low-resolution texture encoder 1100b, besides a time prediction signal which is obtained by motion compensation of the second motion compensator 110.

As shown in FIG. 3(a), the low-resolution texture signal for forming the low-resolution image space 206 is obtained by down-sampling the high-resolution texture signal for forming the high-resolution image space 205. Therefore, in order to utilize the regenerative low-resolution texture signal as a space prediction signal in the high-resolution texture encoder 1100a, it is required to interpolate the regenerative low-resolution texture signal by up-sampling and the like.

For this reason, the space prediction signal is interpolated by up-sampling in the texture converter 1125, and the interpolated space prediction signal is supplied to the prediction signal generating unit 1110a in the high-resolution texture encoder 1100a.

Figure 7:
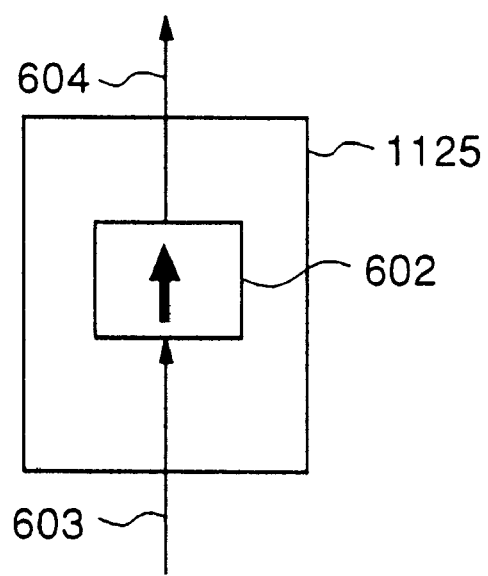
FIG. 7 is a diagram illustrating a construction of a texture converter constituting the digital image coding apparatus according to the first embodiment of the invention.

More specifically, in an interpolator 602 constituting the texture converter 1125 shown in FIG. 7, an interpolation value is generated using an even-tap filter, and sample values constituting the space prediction signal are interpolated according to this interpolation value.

The space prediction signal which has been subjected to this up-sampling processing, together with the time prediction signal, is input to the averaging unit 124. This averaging unit 124 generates a prediction signal corresponding to the high-resolution texture signal, which prediction signal is obtained by weighting and averaging the time prediction signal and the space prediction signal on the basis of a mode decision output from the mode decision unit (not shown), and supplies this prediction signal to the third and fourth adders 102 and 107.

In this embodiment, although three ratios, 1:0, 0:1 and 1/2:1/2, are used as ratios for weighting the space prediction signal and the time prediction signal in the averaging unit 124, the signals may be weighted at a ratio other than these ratios. This weighting ratio is not adjusted on the basis of the mode decision output but it may be previously set to a prescribed ratio. In addition, although the space prediction signal is output from the first padding unit 138, this signal may be output from the first frame memory 139.

Figure 5:
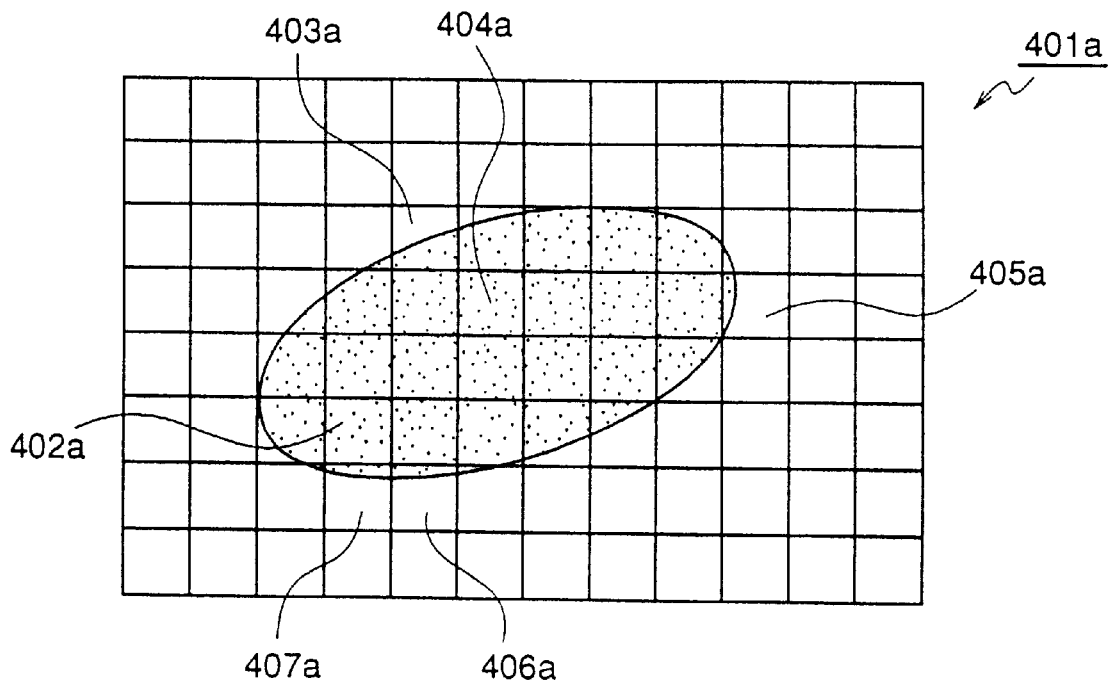
Figure 5:
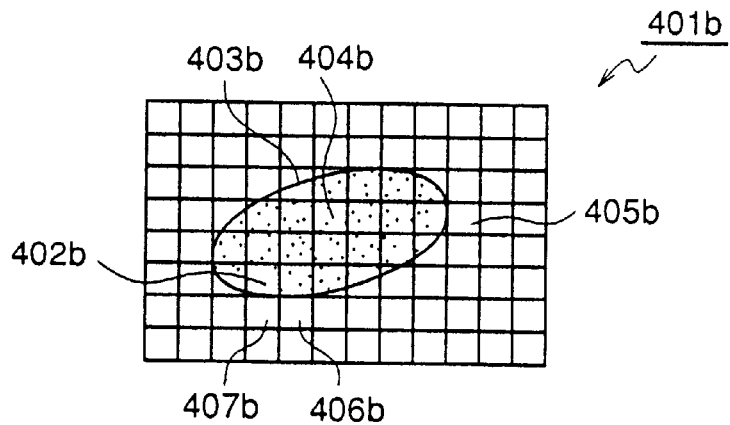

FIG. 5 is a schematic diagram for explaining the processing for generating a prediction signal corresponding to a high-resolution texture signal from the above-mentioned regenerative low-resolution texture signal. In the figure, reference numeral 401a designates high-resolution image space including an image of an object having the arbitrary shape, which is obtained from a high-resolution texture signal, and numeral 401b designates regenerative low-resolution image space including the image of the object having the arbitrary shape, which is obtained from a regenerative low-resolution texture signal. Each image space comprises plural blocks (unit processing regions) and, among the plural blocks, blocks marked with dots include significant samples which are located inside the object.

More specifically, the blocks into which the image space 401a is partitioned indicate processing target blocks to be coded, and the blocks into which the image space 401b is partitioned indicate space prediction blocks corresponding to the respective processing target blocks of the image space 401a. Herein, the respective processing target blocks and the corresponding space prediction blocks are located at the same positions in the image spaces.

For example, the processing target block 404a and the corresponding space prediction block 404b are located at the sixth positions from the left end in horizontal arrangement in the image space 401a and the image space 401b, and located at the fourth positions from the upper end in vertical arrangement, respectively. The processing target block 403a in the image space 401a is located on the boundary of the object, and the corresponding space prediction block 403b in the image space 401b is also located on the boundary of the object.

The low-resolution texture signal corresponding to the space prediction block 403b located on the boundary of the object is up-sampled by the texture converter 1125 after replacing insignificant sample values constituting the low-resolution texture signal using the above-mentioned method, and the up-sampled low-resolution texture signal is subtracted from the high-resolution texture signal of the processing target block 403a corresponding to the space prediction block.

Generally, even if a low-resolution texture signal corresponding to a space prediction block is up-sampled, the boundary of the object in the space prediction block which is obtained by the up-sampling very often disagrees with the boundary of the object in a corresponding processing target block. Therefore, as mentioned above, the low-resolution texture signal corresponding to the space prediction block is padded and then up-sampled, whereby an increase in residual due to disagreement of the boundaries of both the blocks can be suppressed.

In addition, like the processing target blocks 405a, 406a and 407a and the corresponding space prediction blocks 405b, 406b and 407b shown in FIG. 5, there is a case in which, while a processing target block in the image space 401a is located on the boundary of the object, a space prediction block in the image space 401b is wholly located outside the object.

This is because down-sampling for generating the low-resolution texture signal corresponding to the image space 401b and compressive coding of the low-resolution texture signal have warped object shape information of the low-resolution texture signal. In this case, for example, sample values of samples constituting the space prediction block 407b corresponding to the processing target block 407a are not defined, and therefore, if the low-resolution texture signal corresponding to the space prediction block 407b is used as it is and subtracted from the high-resolution texture signal corresponding to the processing target block 407a, the residual between both the signals increases.

Consequently, in the first embodiment of the present invention, as for such a space prediction block outside an object, its sample values are padded with significant sample values of a space block inside the object which is adjacent to the space block outside the object.

That is, the sample values of the space prediction block 407b are replaced with significant sample values of the space prediction block 402b which is located just above.

In this case, since, as for such a block located on the boundary of an object as the space prediction block 402b, its sample values of insignificant samples are padded using the method shown in FIG. 6, the sample values of the space prediction block 407b outside the object may be padded with the sample values of the samples of the space prediction block 402b located on the boundary.

FIGS. 9(a) and 9(b) show examples of this padding processing.

Each of blocks 801, 802, 803 and 804 comprises 4×4 samples. The block 801 and the block 803 are boundary blocks, and all sample values are made significant values by padding processing. Therefore, all the samples 805 to 812 have significant sample values. The block 802 and the block 804 are blocks outside the object.

So, in padding processing to the block 802, the samples 805, 806, 807 and 808 are applied horizontally and repeatedly and the samples of the block 802 are padded with these samples, and in padding processing to the block 804, the samples 809, 810, 811 and 812 are applied vertically and repeatedly and the samples of the block 804 are padded with these samples.

In addition, when there are boundary blocks both in a horizontal direction and in a vertical direction, which blocks are adjacent to a block which is to be subjected to padding processing, an average of all candidate sample values in these boundary blocks can be employed as a pseudo sample value to be replaced, or the largest value among all the candidate sample values can be employed as a pseudo sample value to be replaced.

In this way, padding processing is performed to a space prediction block which is located outside an object, using sample values of a boundary block adjacent to this space prediction block. Thereby, even when the space prediction block is wholly located outside the object, its insignificant sample values are replaced with the sample values inside the object, resulting in a suppressed residual signal between a signal which is obtained by up-sampling a low-resolution texture signal corresponding to the space prediction block and a high-resolution texture signal corresponding to a processing target block.

Figure 8:
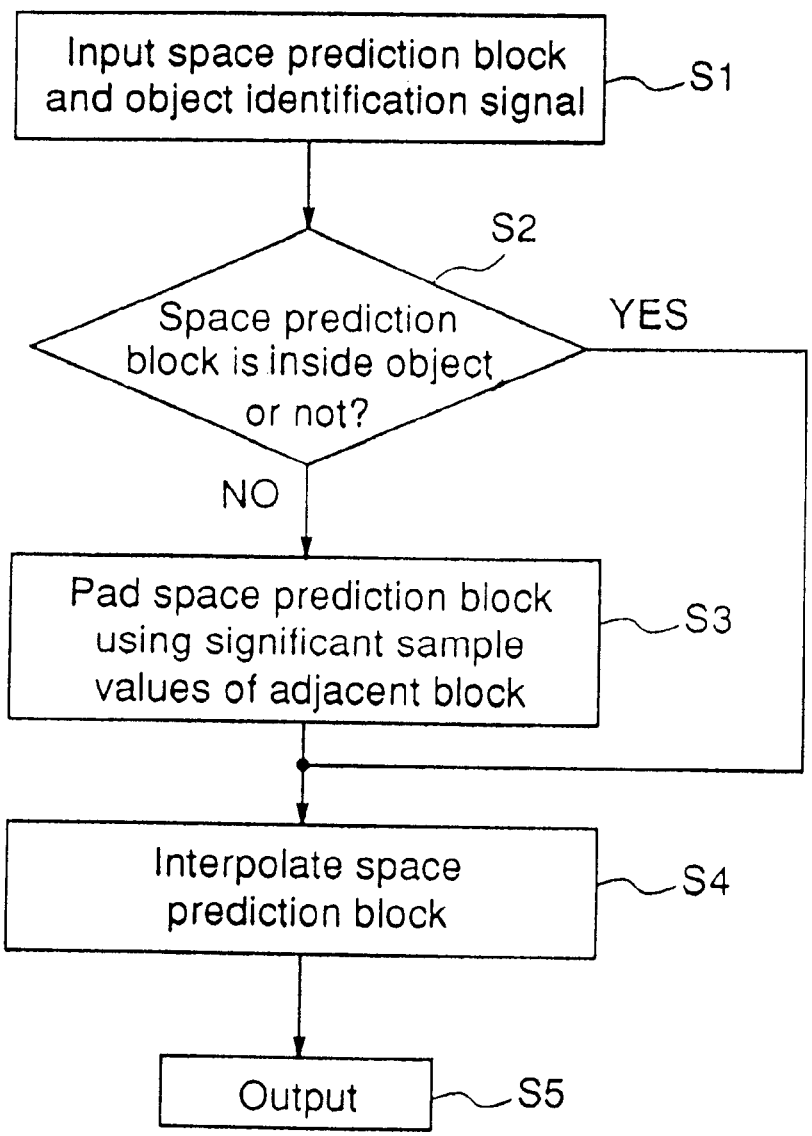
FIG. 8 is a diagram showing a flowchart of padding processing and interpolating processing by the digital image coding apparatus according to the first embodiment of the invention.
Figure 9:
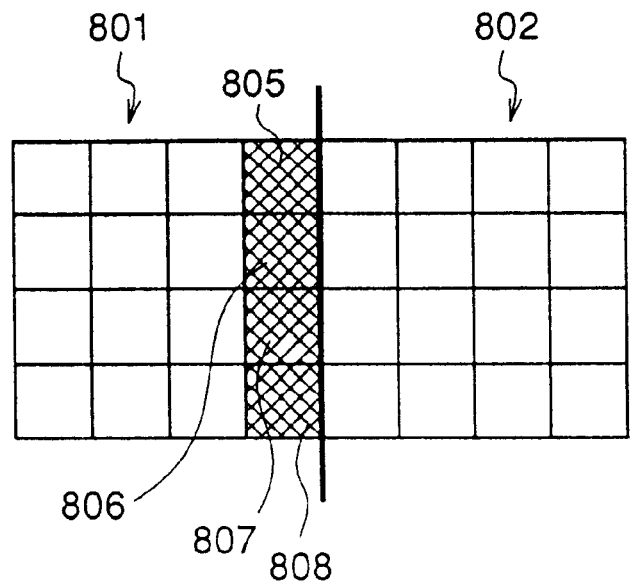
FIGS. 9(a) and 9(b) are schematic diagrams for explaining image padding processing by the digital image coding apparatus according to the first embodiment of the invention.
Figure 9:
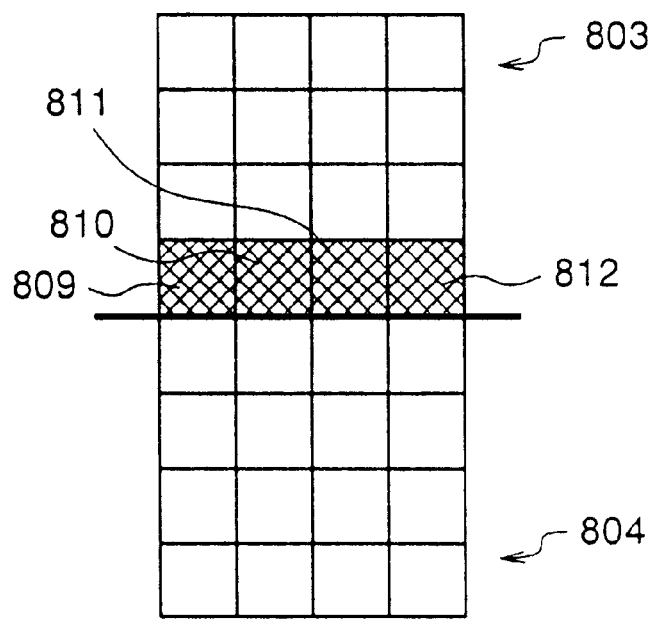

FIG. 8 is a diagram for explaining the operation of the padding unit and the texture converter considering the above-mentioned padding processing, using a flowchart.

Initially, a regenerative low-resolution texture signal corresponding to a space prediction block and an identification signal LDkd indicating that the space prediction block is inside an object or not are input to the padding unit 138 (step S1). The identification signal LDkd indicating that the space prediction block is inside the object or not is an expanded shape signal (shape information of the object) which has been generated by the low-resolution shape encoder 1200b in the shape coding unit 1200.

Next, decision as to whether the space prediction block is inside the object or not is performed by the padding unit 138, using the identification signal (step S2). If the space prediction block is inside the object, the space prediction block is output as it is without performing padding processing, and up-sampled by the texture converter 1125 (step S4). Meanwhile, when the space prediction block is inside the object, padding processing using sample values of significant samples of an adjacent block is performed to the space prediction block (step S3), and then, a low-resolution texture signal corresponding to the space prediction block is up-sampled by the texture converter 1125 (step S4). In addition, padding of a block outside an object adjacent to a boundary block may be executed by the above-mentioned padding unit.

In the first embodiment, although the preprocessor 1100c shown in FIG. 3(a) is used in order to hierarchize a texture signal, a preprocessor 207 shown in FIG. 3(b) may be employed in the hierarchization processing, in place of the preprocessor 1100c.

This preprocessor 207 has an input terminal 208 and first and second output terminals 209 and 210, and has a construction in which switching between the connecting state of the input terminal 208 and the first output terminal 209 and the connecting state of the input terminal 208 and the second output terminal 210 is performed at constant time intervals.

For example, when a texture signal is input to the input terminal 208, switching between the connecting state of the input terminal 208 and the firs output terminal 209 and the connecting state of the input terminal 208 and the second output terminal 210 is performed at prescribed time intervals, by a switch 207a.

At this time, the input terminal 208 and the second output terminal 210 are in the connecting state at time intervals of t (t: integer), t+N and t+2N, and the input texture signal is output to the second output terminal. The texture signal output from the second output terminal 210 is supplied, as a low-resolution texture signal, to the first input terminal 131 shown in FIG. 2.

The texture signal (image data) between the times t and t+N is output to the first output terminal 209, and the texture signal output from the first output terminal 209 is supplied, as a high-resolution texture signal, to the second input terminal 101 shown in FIG. 2. Herein, N is an arbitrary integer and, in this embodiment, it is assumed that N is 3.

In this case, in the converter shown in FIG. 7, a motion compensator is used in place of the interpolator, and a prediction signal which is obtained by motion compensation is read from the first frame memory 139 to process the prediction signal (prediction signal obtained from the low-resolution texture signal) so that its time resolution agrees with that of the high-resolution texture signal. In this case, it is required to transmit a motion vector to the motion compensator although it is not shown in the figure. In all cases, when a texture signal with a hierarchy is subjected to difference coding in hierarchical coding processing, using a regenerative signal which is obtained from another hierarchy, i.e., a hierarchy with different resolution, padding processing of the regenerative signal must be executed.

Thus, in the first embodiment, as shown in FIG. 2, the encoder 1100b for performing difference coding to a low-resolution texture signal Std, and the encoder 1100a for performing difference coding to a high-resolution texture signal Sth are included and, when difference coding is performed to a high-resolution texture signal Sth using its prediction signal, padding processing in which insignificant sample values of a low-resolution texture signal that has been regenerated by the encoder 1100b are replaced with pseudo sample values that are obtained from significant sample values thereof, is performed by the padding unit 138 in the encoder 1100b, to generate the prediction signal corresponding to the high-resolution texture signal Sth on the basis of the regenerative low-resolution texture signal which has been subjected to the padding processing. Accordingly, the prediction signal of the high-resolution texture signal Sth is generated on the basis of the regenerative low-resolution texture signal which has been subjected to padding processing. Consequently, a difference signal which is a difference between a high-resolution texture signal of a block as a target of coding processing (unit processing region) and its prediction signal is suppressed, whereby difference coding can be executed to a high-resolution texture signal corresponding to a block located on the boundary of an object, with suppressing degradation of the coding efficiency.

Further, since, in coding processing of a high-resolution texture signal Sth of a target unit region as a target of coding processing, a signal which is generated on the basis of a regenerative low-resolution texture signal of the target unit region is used as its prediction signal, the coding processing of the high-resolution texture signal Sth merely delays by time for processing the unit region, as compared with coding processing of a low-resolution texture signal Std. Therefore, at the side of decoding, on the basis of a coded LT difference signal Etd and a coded HT difference signal Eth which are obtained by coding the low-resolution texture signal Std and the high-resolution texture signal Sth, a high-resolution image and a low-resolution image can be regenerated almost without a time lag.

Since padding processing of a regenerative low-resolution texture signal corresponding to each unit region is performed on the basis of significant pixel values in the regenerative low-resolution texture signal, a difference between a prediction signal of a high-resolution texture signal which is obtained from the low-resolution texture signal and the high-resolution texture signal can be effectively suppressed.

Since a regenerative low-resolution texture signal which has been subjected to padding processing is stored in the frame memory 139 and a regenerative high-resolution texture signal which has been subjected to padding processing is stored in the frame memory 109, motion detection and motion compensation can be executed with good precision.

In addition, in the first embodiment, although in the encoders 1200a and 1200b constituting the shape coding unit 1200, a regenerative low-resolution shape signal LDkd and a regenerative high-resolution shape signal LDkh are used as it is in generating prediction signals, ones which are obtained by performing padding processing to the regenerative low-resolution shape signal LDkd and the regenerative high-resolution shape signal LDkh may be employed in generating prediction signals.

Embodiment 2.

Figure 10:
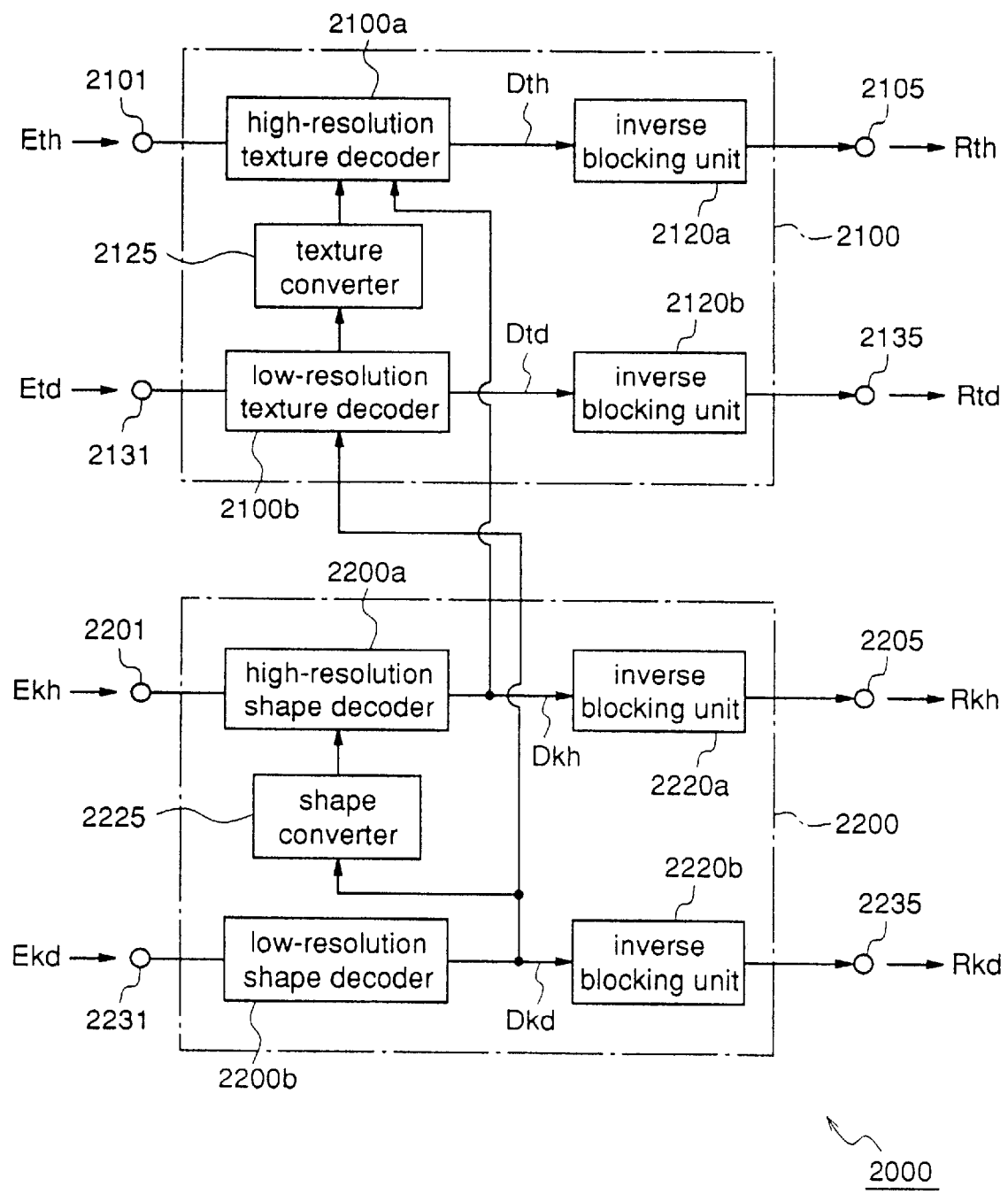
FIG. 10 is a block diagram illustrating a general construction of a digital image decoding apparatus in accordance with a second embodiment of the present invention.

FIG. 10 is a block diagram for explaining a digital image decoding apparatus 2000 according to a second embodiment of the present invention.

This digital image decoding apparatus 2000 is constructed so that a coded image signal which is obtained by performing scalability coding processing to an image signal in the digital image coding apparatus 1000 of the first embodiment can be decoded object by object, and has a texture decoding unit 2100 for performing scalability decoding processing to a coded texture signal constituting the coded image signal, and a shape decoding unit 2200 for performing scalability decoding processing to a coded shape signal constituting the coded image signal.

The texture decoding unit 2100 includes a high-resolution texture decoder 2100a for performing difference decoding processing to a coded high-resolution texture difference signal (coded HT difference signal) Eth for each of blocks and outputting a decoded high-resolution texture signal (hereinafter also referred to as a regenerative high-resolution texture signal) Dth, an inverse blocking unit 2120a for integrating the decoded high-resolution texture signals Dth corresponding to the respective blocks and outputting a regenerative high-resolution texture signal Rth of a scanning line structure, a low-resolution texture decoder 2100b for performing difference decoding processing to a coded low-resolution texture difference signal (coded LT difference signal) Etd for each of blocks and outputting a decoded low-resolution texture signal (hereinafter also referred to as a regenerative high-resolution texture signal) Dtd, and an inverse blocking unit 2120b for integrating the decoded low-resolution texture signals Dtd corresponding to the respective blocks and outputting a regenerative low-resolution texture signal Rtd of a scanning line structure.

The texture decoding unit 2100 further includes a texture converter 2125 for performing conversion so that a regenerative signal used for the difference decoding processing of the coded LT difference signal can be utilized for the difference decoding processing of the coded HT difference signal, and outputting the resulting signal to the high-resolution texture decoder 2100a.

The shape decoding unit 2200 includes a high-resolution shape decoder 2200a for performing difference decoding processing to a coded high-resolution shape difference signal (coded HS difference signal) Ekh for each of blocks and outputting a decoded high-resolution shape signal Dkh, an inverse blocking unit 2220a for integrating the decoded high-resolution shape signals Dkh corresponding to the respective blocks and outputting a regenerative high-resolution shape signal Rkh of a scanning line structure, a low-resolution shape decoder 2200b for performing difference decoding processing to a coded low-resolution shape difference signal (coded LS difference signal) Ekd for each of blocks and outputting a decoded low-resolution shape signal Dkd, and an inverse blocking unit 2220b for integrating the decoded low-resolution shape signals Dkd corresponding to the respective blocks and outputting a regenerative low-resolution shape signal Rkd of a scanning line structure.

The shape decoding unit 2200 further includes a shape converter 2225 for performing conversion so that a regenerative signal used for the difference decoding processing of the coded LS difference signal can be utilized for the difference decoding processing of the coded HS difference signal, and outputting the resulting signal to the high-resolution shape decoder 2200a.

Figure 11:
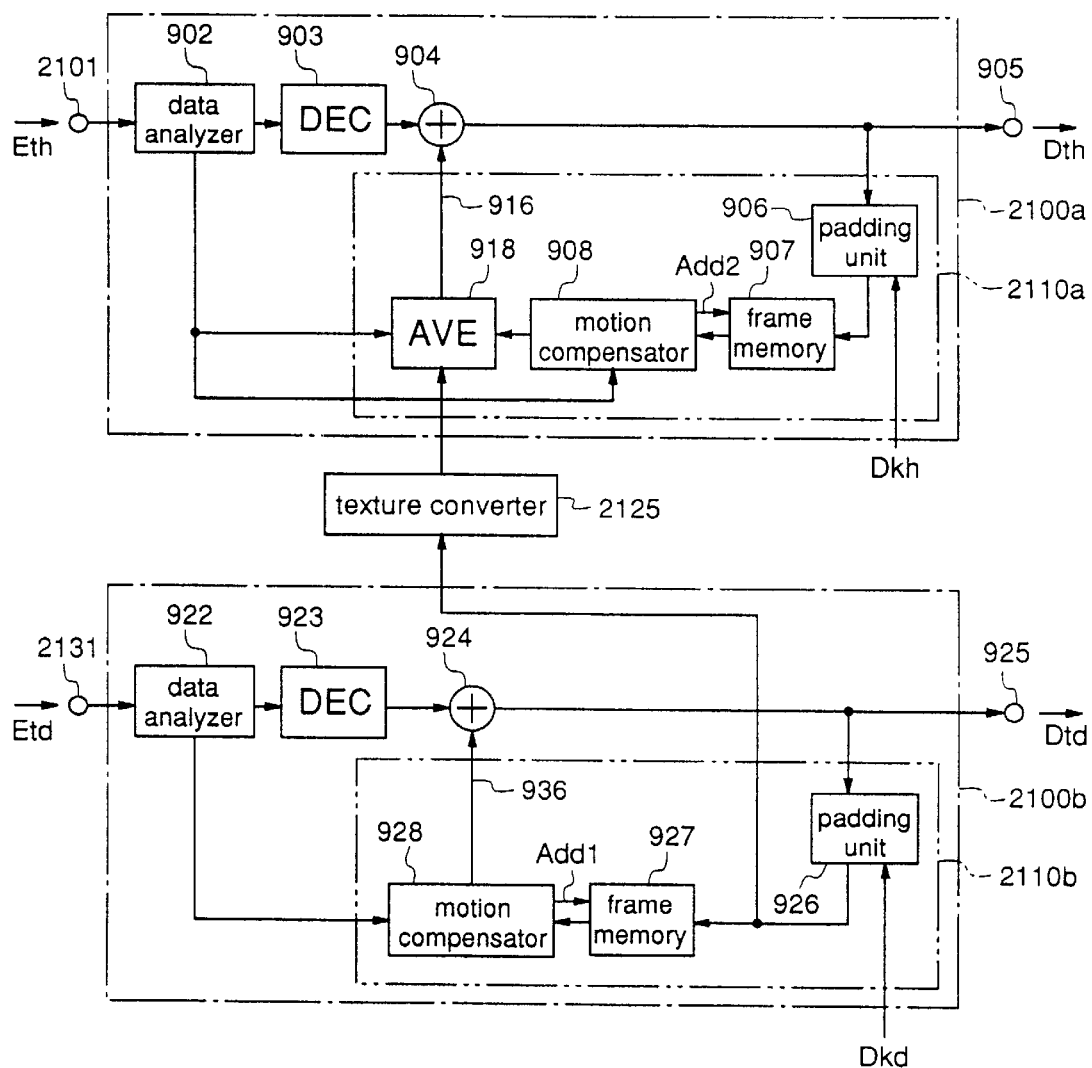
FIG. 11 is a block diagram illustrating a detailed construction of texture decoding units constituting the digital image decoding apparatus according to the second embodiment of the invention.

A description is given of detailed constructions of the respective decoders 2100a and 2100b in the texture decoding unit 2100, using FIG. 11.

The low-resolution texture decoder 2100b consists of a first data analyzer 922 for analyzing a coded LT difference signal of a target region (target block) as a target of decoding processing and performing variable-length decoding thereto, a first information expander (DEC) 923 for performing expansion processing to the output of the data analyzer 922 and outputting an expanded difference signal, a first adder 924 for adding a prediction signal corresponding to the target block to the expanded difference signal and outputting a decoded low-resolution texture signal, and a prediction signal generating unit 2110b for generating the prediction signal corresponding to the block.

As shown in FIG. 4(b), the first information expander 923 consists of an inverse quantizer 308 for performing inverse quantizing processing to the output of the data analyzer 922, and an IDCT unit 309 for performing IDCT (Inverse Discrete Cosine Transformation) processing, which is a kind of inverse frequency transformation processing, to the output of the inverse quantizer 308.

The prediction signal generating unit 2110b includes a first padding unit 926 for receiving the output of the adder 924 and padding insignificant sample values (pixel values) in the regenerative low-resolution texture signal on the basis of a low-resolution shape signal Dkd which has been decoded by the low-resolution shape decoding unit 2200b, and a first frame memory 927 for storing the padded regenerative low-resolution texture signal (decoded low-resolution texture signal) as the output of the padding unit 926, and the output of the padding unit 926 is also output to the texture converter 2125.

The prediction signal generating unit 2110b further includes a first motion compensator 928 for detecting, on the basis of the output of the first frame memory 927 and a motion vector corresponding to the target block which has been decoded by the data analyzer 922, a prediction region providing a regenerative low-resolution texture signal having the smallest difference with the regenerative low-resolution texture signal of the target block, from the first frame memory 927, reading the regenerative low-resolution texture signal corresponding to the prediction region, as the prediction signal, and outputting the same to the first adder 924.

Meanwhile, the high-resolution texture decoder 2100a has almost the same construction as that of the low-resolution texture decoder 2100b.

That is, the high-resolution texture decoder 2100a consists of a second data analyzer 902 for analyzing a coded HT difference signal of a target region (target block) as a target of decoding processing and performing variable-length decoding thereto, a second information expander (DEC) 903 for performing expansion processing to the output of the data analyzer 902 and outputting an expanded difference signal, a second adder 904 for adding a prediction signal corresponding to the target block to the expanded difference signal and outputting a decoded high-resolution texture signal, and a prediction signal generating unit 2110a for generating the prediction signal corresponding to the block.

As shown in FIG. 4(b), the second information expander 903 consists of an inverse quantizer 308 for performing inverse quantizing processing to the output of the data analyzer 902, and an IDCT unit 309 for performing IDCT (Inverse Discrete Cosine Transformation) processing, which is a kind of inverse frequency transformation processing, to the output of the inverse quantizer 308.

The prediction signal generating unit 2110a includes a second padding unit 906 for receiving the output of the second adder 904 and padding insignificant sample values (pixel values) in the regenerative high-resolution texture signal on the basis of a high-resolution shape signal Dkh which has been decoded by the high-resolution shape decoding unit 2200a, and a second frame memory 907 for storing the padded regenerative high-resolution texture signal (decoded high-resolution texture signal) as the output of the padding unit 906.

The prediction signal generating unit 2110a further includes a second motion compensator 908 for detecting, on the basis of the output of the second frame memory 907 and a motion vector corresponding to the target block which has been decoded by the data analyzer 902, a prediction region providing a regenerative high-resolution texture signal having the smallest difference with the regenerative high-resolution texture signal of the target block, from the frame memory 907, and reading the regenerative high-resolution texture signal corresponding to the prediction region, as the prediction signal, and an averaging unit (AVE) 918 for averaging the output of the second motion compensator 908 and the output of the texture converter 2125 on the basis of the motion vector, and outputting the resulting average to the second adder 904.

A description is given of specific constructions of the low-resolution shape decoder 2200b and the high-resolution shape decoder 2200a. Since these decoders fundamentally have the same constructions as those of the low-resolution texture decoder 2100b and the high-resolution texture decoder 2100a, no detailed description using a figure is given thereof, and only the difference in construction between each texture decoder and each shape decoder is described briefly.

That is, the low-resolution shape decoder 2200b is different from the low-resolution texture decoder 2100b only in that the shape encoder does not have the padding unit 926 in the low-resolution texture decoder 2100b and has a construction in which the output of the adder 924 is input directly to the first frame memory 927. The high-resolution shape decoder 2200a is different from the high-resolution texture decoder 2100a only in that the shape encoder does not have the padding unit 906 in the high-resolution texture decoder 2100a and has a construction in which the output of the adder 904 is input directly to the second frame memory 907.

A description is given of the operation.

A multiplexed coded image signal corresponding to a prescribed object which is input to the image decoding apparatus 2000 is divided, at the previous stage of the image decoding apparatus 2000, into a coded HT difference signal Eth, a coded LT difference signal Etd, a coded HS difference signal Ekh, a coded LS difference signal Ekd, and other control signals, and the coded HT and LT difference signals are input to the texture decoding unit 2100 and the coded HS and LS difference signals are input to the shape decoding unit 2200.

Then, in the texture decoding unit 2100, scalability decoding processing is performed to both the coded texture difference signals and, in the shape decoding unit 2200, scalability decoding processing is performed to both the shape signals.

More specifically, in the texture decoding unit 2100, the coded LT difference signal Etd is input to the first data analyzer 922 via a first input terminal 2131, its data analysis is performed by the analyzer 922, and the coded LT difference signal which has been subjected to variable-length decoding is output to the first information expander 923. At this time, a motion vector of a target block as a target of decoding processing is output from the data analysis 922 to the first motion compensator 928 in the prediction signal generating unit 2110b.

In the first information expander 923, expansion processing is performed to the coded LT difference signal which has been subjected to variable-length decoding to restore the low-resolution texture difference signal as the expanded low-resolution texture difference signal.

In this embodiment, as shown in FIG. 4(b), inverse quantizing processing is performed to the coded LT difference signal which has been subjected to variable-length decoding, by the inverse quantizer 308 and, further, inverse frequency transformation processing in which a frequency region signal is converted into a space region signal is performed thereto, by the inverse discrete cosine transformation unit 309.

At this time, in the first motion compensator 928, an address Add1 for accessing the first frame memory 927 is generated on the basis of the motion vector, and a prediction signal of the regenerative low-resolution texture signal corresponding to the target block is read from among regenerative low-resolution texture signals which are stored, as low-resolution texture signals for reference, in the first frame memory 927. This read prediction signal and the output of the information expander 923 are input to the adder 924, and a decoded low-resolution texture signal (regenerative low-resolution texture signal) Dtd is output as the added value of these signals, from the adder 924 to a first output terminal 925.

At this time, the regenerative low-resolution texture signal Dtd is also input to the first padding unit 926, and this signal is subjected to padding processing in which insignificant sample values of the object are replaced using significant sample values of the object, as mentioned above. Thus padded regenerative low-resolution texture signal Dtd is stored in the first frame memory 927.

Meanwhile, in the texture decoding unit 2100, the coded HT difference signal Eth is input to the second data analyzer 902 via a second input terminal 2101, its data analysis is performed by the analyzer 902, and the coded HT difference signal which has been subjected to variable-length decoding is output to the second information expander 903. At this time, a motion vector of the target block as a target of decoding processing is output from the data analysis 902 to the second motion compensator 908 in the prediction signal generating unit 2110a.

In the second information expander 903, expansion processing is performed to the coded HT difference signal which has been subjected to variable-length decoding to restore the high-resolution texture difference signal as the expanded high-resolution texture difference signal.

In this embodiment, as shown in FIG. 4(b), inverse quantizing processing is performed to the coded HT difference signal which has been subjected to variable-length decoding, by the inverse quantizer 308 and, further, inverse frequency transformation processing in which a frequency region signal is converted into a space region signal is performed thereto, by the inverse discrete cosine transformation unit 309.

At this time, in the second motion compensator 908, an address Add2 for accessing the second frame memory 907 is generated on the basis of the motion vector, and a prediction signal corresponding to the target block is read, as a time prediction signal, from among regenerative high-resolution texture signals which are stored, as high-resolution texture signals for reference, in the second frame memory 907.

Further, in the texture converter 2125, the same up-sampling processing as shown in FIG. 7 and FIG. 8 is performed to output a space prediction signal which has been thus up-sampled, to the averaging unit 918. In the averaging unit 918, the time prediction signal from the second motion compensator 908 and the space prediction signal are weighted and averaged on the basis of a mode signal from the data analyzer, to generate a prediction signal of the regenerative high-resolution texture signal. Although a weighting ratio may be previously set at the transmit/receive side, in this embodiment, weighting information, together with the coded high-resolution texture signal, is transmitted, and it is extracted from the second data analyzer 902 to be input to the averaging unit 918.

Thereafter, the output of the averaging unit 918 and the expanded high-resolution texture difference signal as the output of the information expander 903 are input to the adder 904. Then, a regenerative high-resolution texture signal Dth is output as the added value of these signals, from the adder 904 to a second output terminal 905.

At this time, the regenerative high-resolution texture signal Dth is also input to the second padding unit 906, and this signal is subjected to padding processing in which insignificant sample values of the object are replaced using significant sample values of the object, as mentioned in FIG. 6. The decoded regenerative high-resolution texture signal Dth which has been thus padded is stored in the second frame memory 907.

Thus, in the second embodiment, as shown in FIG. 11, the decoder 2100b for performing difference decoding to a coded low-resolution texture difference signal Etd, and the decoder 2100a for performing difference decoding to a coded high-resolution texture difference signal Eth are included and, when difference decoding is performed to a coded high-resolution texture difference signal Eth using its prediction signal, padding processing in which insignificant sample values of a low-resolution texture signal that has been regenerated by the decoder 2100b are replaced with pseudo sample values that are obtained from significant sample values thereof, is performed by the padding unit 926 in the decoder 2100b, to generate the prediction signal on the basis of the regenerative low-resolution texture signal which has been subjected to the padding processing. Accordingly, the prediction signal of the regenerative high-resolution texture signal Dth is generated on the basis of the regenerative low-resolution texture signal which has been subjected to padding processing. Consequently, hierarchical decoding processing corresponding to hierarchical coding processing in which a difference signal that is a difference between a regenerative high-resolution texture signal of a block as a target of coding processing (unit processing region) and its prediction signal is suppressed, can be realized.

Further, since, in decoding processing of a coded HT difference signal corresponding to a target unit region as a target of decoding processing, a signal which is generated on the basis of a regenerative low-resolution texture image signal of the target unit region is used as its prediction signal, the decoding processing of the coded HT difference signal Eth merely delays by time for processing the unit region, as compared with decoding processing of a coded LT difference signal Etd. Therefore, on the basis of coded HT and LT difference signals which are obtained by hierarchical coding processing of an image signal, a high-resolution image and a low-resolution image can be regenerated almost without a time lag.

Since padding processing of a regenerative low-resolution texture signal corresponding to each unit region (block) is performed on the basis of significant pixel values in the regenerative low-resolution texture signal, a coded difference signal which is obtained by coding with effectively suppressing a difference between a prediction signal of a high-resolution texture signal which is obtained from the low-resolution texture signal and the high-resolution texture signal, can be accurately decoded.

Since a regenerative low-resolution texture signal which has been subjected to padding processing is stored in the frame memory 927 and a regenerative high-resolution texture signal which has been subjected to padding processing is stored in the frame memory 907, motion compensation in hierarchical decoding processing can be executed with good precision.

In addition, in the second embodiment, although a space prediction signal is transmitted from the padding unit 926, this space prediction signal may be supplied from the first frame memory 927 to the averaging unit.

When a coded low-resolution texture signal and a coded high-resolution texture signal correspond to image spaces of the same sizes, and have image information with a time lag (FIG. 3(b)), in place of an interpolator, a motion compensator is used in the converter 2125, and a prediction signal which is obtained by motion compensation is read from the first frame memory 927 to process this prediction signal so that its time resolution agrees with that of the high-resolution texture signal. In this case, it is required to transmit a motion vector to the motion compensator although it is not shown in the figure. In all cases, when a coded texture difference signal with a hierarchy is subjected to difference decoding in hierarchical decoding processing, using a regenerative signal which is obtained from another hierarchy, i.e., a hierarchy with different resolution, padding processing of the regenerative signal must be executed.

In the second embodiment, although in the decoders 2200a and 2200b constituting the shape decoding unit 2200, a regenerative low-resolution shape signal Dkd and a regenerative high-resolution shape signal Dkh are used as it is in generating prediction signals, ones which are obtained by performing padding processing to the regenerative low-resolution shape signal Dkd and the regenerative high-resolution shape signal Dkh may be employed in generating prediction signals.

In the second embodiment, although hierarchical coding processing and hierarchical decoding processing with two hierarchies are described, also in hierarchical coding processing and hierarchical decoding processing with three hierarchies or more, when an image signal of an upper hierarchy (a hierarchy with high resolution) is predicted from an image signal of a lower hierarchy (a hierarchy with low resolution), the image signal of the lower hierarchy may be padded as mentioned above.

Furthermore, a coding or decoding program for realizing the construction of the coding processing or decoding processing described in each embodiment is recorded on a data recording medium, such as a floppy disk, whereby the processing described in each embodiment can be executed easily in an individual computer system.

Figure 12:
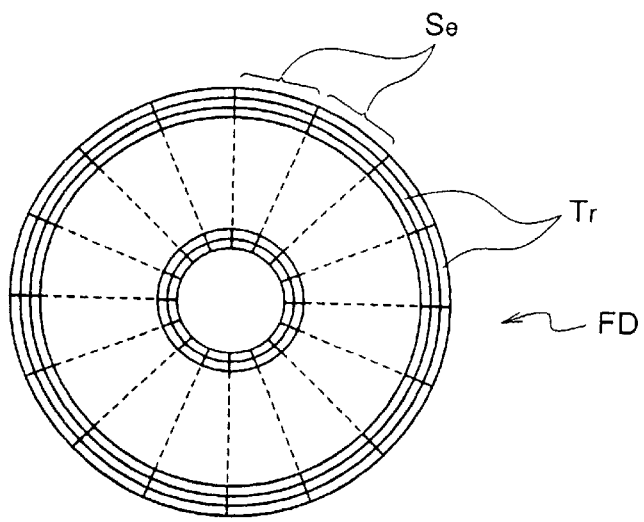
FIGS. 12(a), 12(b) and 12(c) are diagrams for explaining a data recording medium containing a program for realizing the digital image coding apparatus or digital image decoding apparatus according to each embodiment by a computer system.
Figure 12:
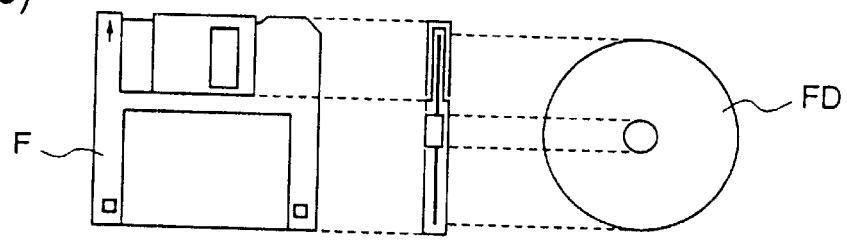
Figure 12:
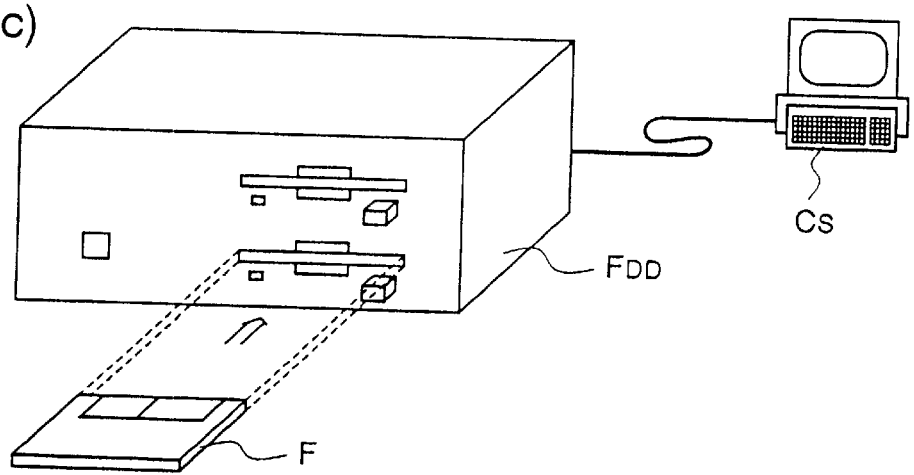

FIG. 12 is a diagram for explaining a case where the coding or decoding processing according to any of the above-mentioned embodiments is executed in a computer system, using a floppy disk containing the coding or decoding program.

FIG. 12(b) shows an exterior seen from the front of a floppy disk, its cross-sectional structure, and a floppy disk, and FIG. 12(a) shows an example of a physical format of the floppy disk as a recording medium body. The floppy disk FD is contained in a case F, plural tracks Tr are concentrically formed on the surface of the disk from the outer circumference toward the inner circumference, and each track is divided into 16 sectors Se in the angular direction. Therefore, in the floppy disk containing the program, in a region allocated on the floppy disk FD, data as the program is recorded.

FIG. 12(c) shows a construction for recording/reproducing the program on the floppy disk FD. When the program is recorded on the floppy disk FD, data as the program from a computer system Cs is written via a floppy disk drive FDD. When the above-mentioned coding or decoding apparatus is constructed in the computer system Cs by the program in the floppy disk, the program is read from the floppy disk FD by the floppy disk drive FDD and transmitted to the computer system Cs.

Although in the above description the floppy disk is used as the data recording medium, an optical disk may be employed. Further, the recording medium is not limited to these disks, and any medium on which a program can be recorded, such as an IC card or a ROM cassette, may be employed.

INDUSTRIAL AVAILABILITY

As mentioned above, the digital image coding method, digital image coding apparatus, digital image decoding method, digital image decoding apparatus, and data recording media according to the present invention can improve coding efficiency in compression processing of image signals, and are very useful in realizing image coding processing and image decoding processing in a system executing transmission/storage of image signals. Especially, these apparatuses, methods, and media are suitable for compression/expansion processing of moving pictures based on standards such as MPEG4.

What is claimed is:

1. A digital image decoding apparatus comprising:
a first decoding unit for decoding a first coded image signal including an image having an arbitrary shape and comprising plural pixels, to generate a first regenerative image signal; and
a second decoding unit for decoding a second coded image signal having different temporal resolution from that of the first image signal, including the image and having an arbitrary shape and comprising plural pixels;
wherein the first decoding unit includes:
first decoding means for performing decoding processing in which a first regenerative image signal is generated from the first coded image signal, to each of unit regions into which the image is divided; and
padding means for performing padding processing in which insignificant pixel values are replaced with pseudo pixel values obtained by a specified method, to the first regenerative image signal corresponding to each unit region; and
the second decoding unit includes:
prediction signal generating means for predicting a second regenerative image signal corresponding to each unit region on the basis of the first regenerative image signal which has been subjected to the padding processing, to generate a regenerative prediction signal; and
second decoding means for performing difference decoding processing to each of unit regions, in which decoding processing the second coded image signal corresponding to each unit region is decoded to regenerate a difference signal between the second image signal and its prediction signal, and the regenerative prediction signal is added to the difference signal to generate a second regenerative image signal;
wherein the prediction signal generating means comprises:
prediction means for predicting the second regenerative image signal corresponding to each unit region on the basis of the second regenerative image signal to generate an auxiliary prediction signal;
switching means for performing switching between the auxiliary prediction signal and the first regenerative image signal which has been subjected to the padding process on the basis of control information included in the second coded image signal; and
the output of the switching means being output as the prediction signal of the second regenerative image signal corresponding to each unit region.

* * * * *

UNITED STATES PATENT AND TRADEMARK OFFICE
CERTIFICATE OF CORRECTION

PATENT NO. : 6,154,570
DATED : November 28, 2000
INVENTOR(S) : Choong Seng BOON

It is certified that error appears in the above-identified patent and that said Letters Patent is hereby corrected as shown below:

```
On the title page, column 1 [30] change
the priority document number from "8-00006" to
--8-300006--.
```

Signed and Sealed this

Eighth Day of May, 2001

Attest:

NICHOLAS P. GODICI

*Attesting Officer*   Acting Director of the United States Patent and Trademark Office